US012700007B2

(12) United States Patent
Prasad Tanniru et al.

(10) Patent No.: US 12,700,007 B2
(45) Date of Patent: Aug. 4, 2026

(54) EVIDENCE-BASED ENTERPRISE COMPLIANCE SYSTEMS AND METHODS THEREOF

(71) Applicant: ACCENTURE GLOBAL SOLUTIONS LIMITED, Dublin (IE)

(72) Inventors: Rajendra Prasad Tanniru, Basking Ridge, NJ (US); Koushik M Vijayaraghavan, Chennai (IN); Vijeth Srinivas Hegde, Bangalore (IN); Aditi Kulkarni, Bangalore (IN); Ravindra Kabbinale, Bangalore (IN); Rajalakshmy Iyer, Bangalore (IN); Santhosh Mv, Kasaragod (IN); Mallika Konjeti, Nellore (IN); Ravi Kiran Singh, Dharashiv (IN); Lakshmi Srinivasan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 274 days.

(21) Appl. No.: 18/358,645

(22) Filed: Jul. 25, 2023

(65) Prior Publication Data
US 2025/0037141 A1 Jan. 30, 2025

(51) Int. Cl.
*G06Q 30/018* (2023.01)
*G06F 8/30* (2018.01)

(52) U.S. Cl.
CPC ............. *G06Q 30/018* (2013.01); *G06F 8/30* (2013.01)

(58) Field of Classification Search
CPC ............................... G06Q 30/018; G06F 8/30
See application file for complete search history.

(56) References Cited

U.S. PATENT DOCUMENTS

| | | | | |
|---|---|---|---|---|
| 7,809,667 | B1* | 10/2010 | Yehuda | ................. G06F 21/604 |
| | | | | 726/1 |
| 10,810,055 | B1* | 10/2020 | Walker | ................ G06F 16/2358 |
| 11,243,756 | B1* | 2/2022 | Hussain | .............. H04L 43/0876 |
| 11,645,310 | B2* | 5/2023 | Pham | ...................... G06N 20/20 |
| | | | | 726/1 |
| 11,741,409 | B1* | 8/2023 | Scotney | ......... G06Q 10/063114 |
| | | | | 705/317 |
| 2022/0103453 | A1* | 3/2022 | Novotny | .............. H04L 63/101 |
| 2024/0378312 | A1* | 11/2024 | Lifshotz | .............. G06F 21/6245 |

* cited by examiner

*Primary Examiner* — Jessica Lemieux
*Assistant Examiner* — Emily M. Kraisinger
(74) *Attorney, Agent, or Firm* — Mannava & Kang, P.C.

(57) ABSTRACT

Systems and methods for democratizing compliance in an enterprise. A system receives a selection of a project in the enterprise and a compliance type, causes a list of controls associated with the compliance type to be displayed on a user interface, receives a set of configurations for each of the list of controls from the user, dynamically generates a schema based on the compliance type, the list of controls, and the set of configurations, automatically triggers execution of validation of each of the list of controls for the compliance type based on the generated schema, generates results of the validation, the results including a list of non-compliant controls and a list of compliant controls. The execution of validation of the list of controls is retriggered until each of the list of controls corresponding to the compliance type is compliant.

16 Claims, 21 Drawing Sheets

GLOBAL LEGAL, COMPLIANCE POLICIES, AND REGULATION 302

UPDATE POLICIES

CONSTANT MONITORING

CENTRALIZED LEGAL, COMPLIANCE, AND REGULATION LIBRARY AT ORGANIZATION LEVEL 304

COMPLIANCE SYSTEM 306

PROJECT LEVEL POLICIES

COMPARE PROJECT LEVEL POLICY WITH ORGANIZATION LEVEL POLICY 308

NOTIFY THE LATEST UPDATES TO THE USER TO STAY COMPLIANT 312

DOES THE PROJECT LEVEL POLICY NEED TO BE UPDATED? 310

YES

NO

NO ACTION 314

Figure 16D:
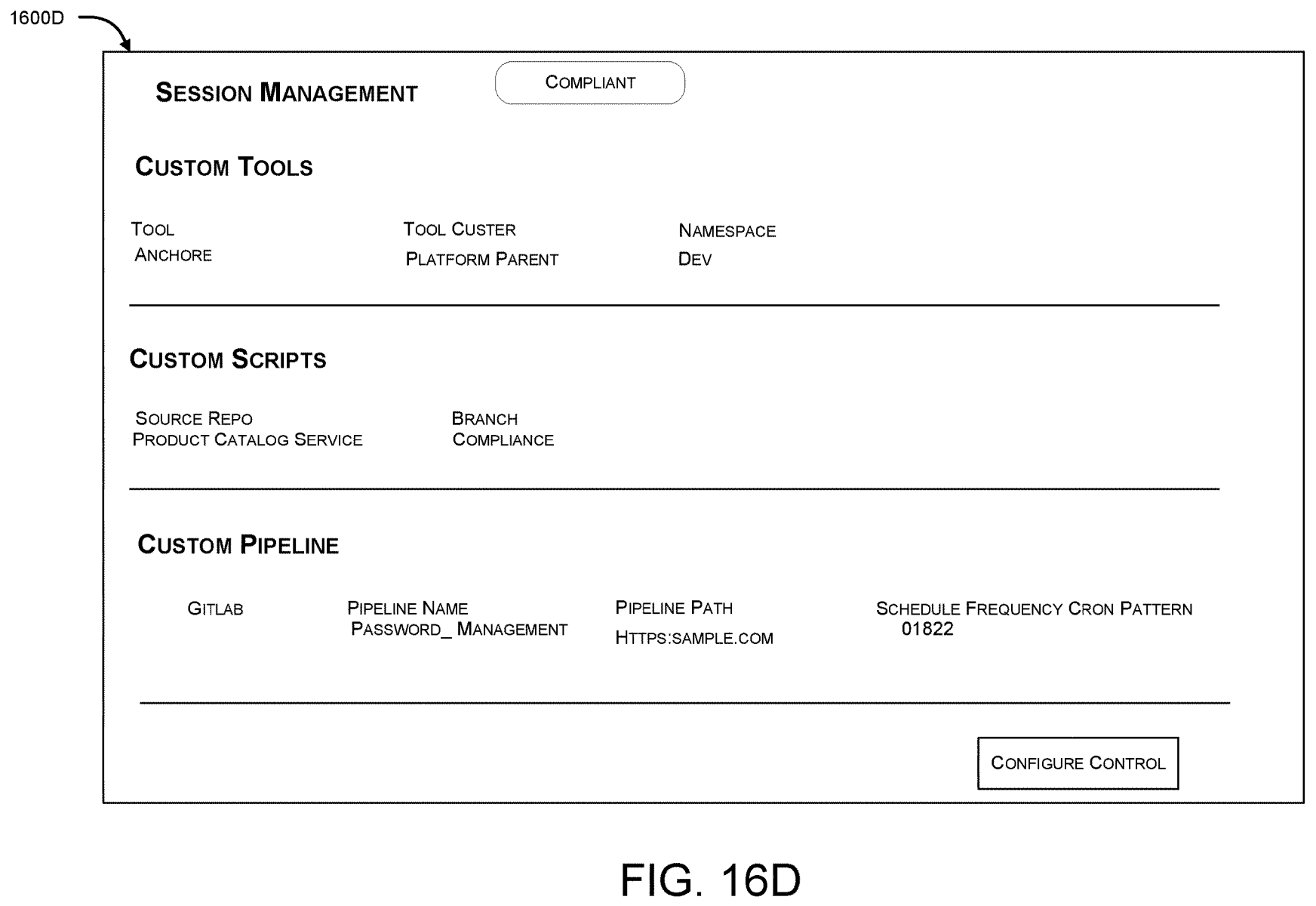

SESSION MANAGEMENT    COMPLIANT

CUSTOM TOOLS

TOOL          TOOL CUSTER        NAMESPACE
ANCHORE       PLATFORM PARENT    DEV

CUSTOM SCRIPTS

SOURCE REPO                BRANCH
PRODUCT CATALOG SERVICE    COMPLIANCE

CUSTOM PIPELINE

GITLAB    PIPELINE NAME              PIPELINE PATH        SCHEDULE FREQUENCY CRON PATTERN
          PASSWORD_ MANAGEMENT       HTTPS:SAMPLE.COM     01822

CONFIGURE CONTROL

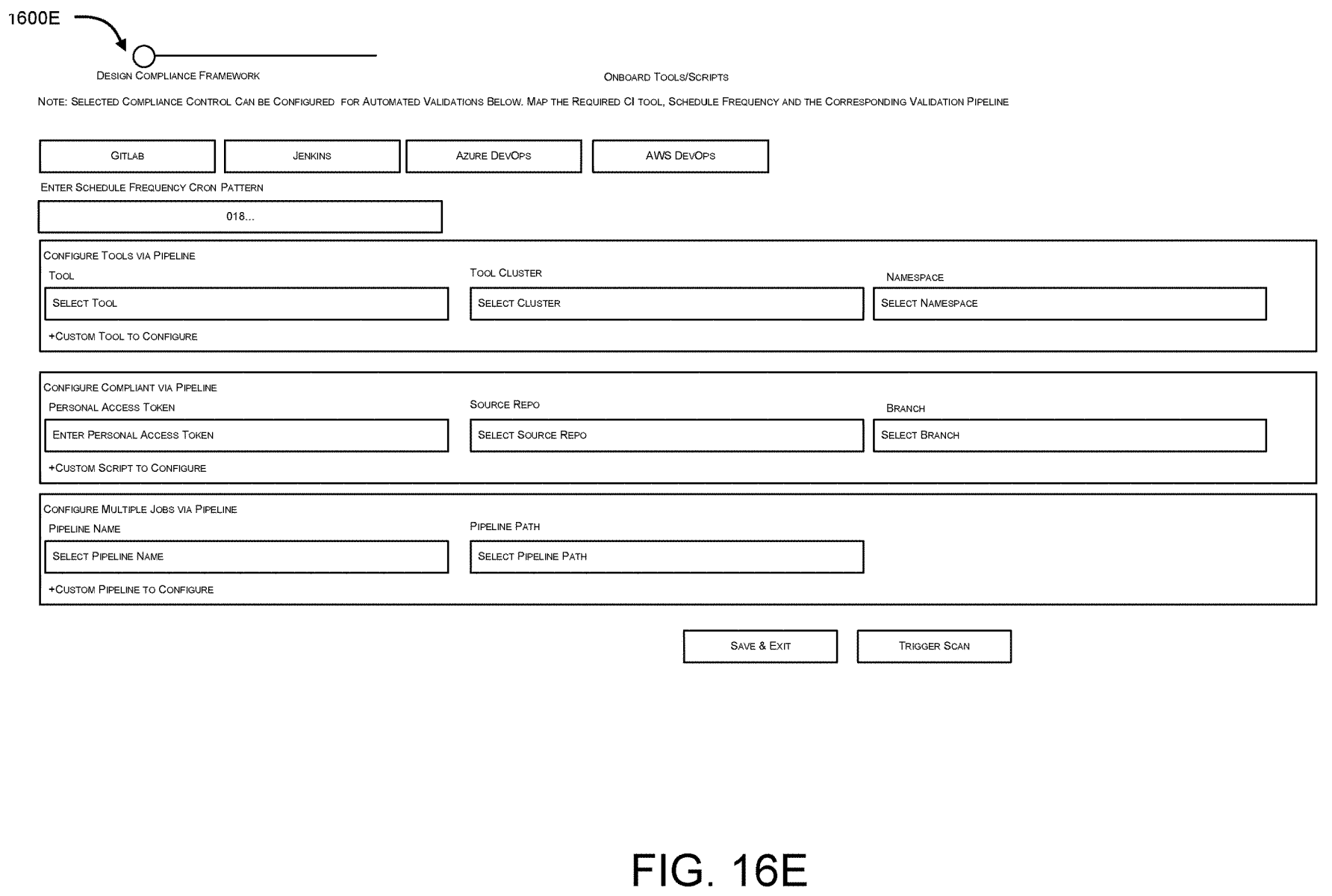

DESIGN COMPLIANCE FRAMEWORK

ONBOARD TOOLS/SCRIPTS

NOTE: SELECTED COMPLIANCE CONTROL CAN BE CONFIGURED FOR AUTOMATED VALIDATIONS BELOW. MAP THE REQUIRED CI TOOL, SCHEDULE FREQUENCY AND THE CORRESPONDING VALIDATION PIPELINE

| GITLAB | JENKINS | AZURE DEVOPS | AWS DEVOPS |

ENTER SCHEDULE FREQUENCY CRON PATTERN

018...

CONFIGURE TOOLS VIA PIPELINE

TOOL                                                 NAMESPACE

SELECT TOOL          SELECT CLUSTER    TOOL CLUSTER    SELECT NAMESPACE

+CUSTOM TOOL TO CONFIGURE

CONFIGURE COMPLIANT VIA PIPELINE

PERSONAL ACCESS TOKEN                                BRANCH

ENTER PERSONAL ACCESS TOKEN    SELECT SOURCE REPO    SOURCE REPO    SELECT BRANCH

+CUSTOM SCRIPT TO CONFIGURE

CONFIGURE MULTIPLE JOBS VIA PIPELINE

PIPELINE NAME

SELECT PIPELINE NAME    SELECT PIPELINE PATH    PIPELINE PATH

+CUSTOM PIPELINE TO CONFIGURE

SAVE & EXIT    TRIGGER SCAN

FIG. 16E

EVIDENCE-BASED ENTERPRISE COMPLIANCE SYSTEMS AND METHODS THEREOF

BACKGROUND

With globalization, organizations are accelerating their digital initiatives, and establishing an enterprise-wide compliance is one of rising concerns. In the current times, though some measures are undertaken to stay compliant, the most prevalent challenges that organizations face are delayed validations of regulations, compliance, and security checks towards the end of a software development life cycle (SDLC). This leads to lot of rework and effort for architects and developers and delays time to market. Moreover, the responsibility of compliance is siloed and is limited to a specific team (like legal or security team), resulting in lack of awareness on the legal obligations from the design and development phase by the members in business units and functional operating units in the organization.

Another challenge is the conventional method of handling compliance policies which is completely trust-based having no evidence for an auditor to certify adherence to compliance. There is also a lack of technical know-how of industry-specific and region-specific data governance, laws, standards, regulations, compliance policies, and obligations to be satisfied leading to non-compliance issues. With the complexity and ever-changing regulations and compliance policies, manually handling these aspects are highly labor-intensive, prone to manual errors, and lead to high operational costs and fines. Another challenge that adds to the cost is the non-standardization and manual checklist that need to be created that makes it challenging to scale compliance and security across the organization.

There is, therefore, a need for systems and methods for addressing at least the above-mentioned problems in existing systems.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system including a processor, and a memory operatively coupled with the processor, wherein the memory includes processor-executable instructions which, when executed by the processor, cause the processor to receive, from a user device associated with a user, a selection of a project in an enterprise and a set of compliance types corresponding to the selected project, cause a list of controls associated with the selected compliance type to be displayed on a user interface of the user device, receive a set of configurations for each of the list of controls from the user, wherein the set of configurations includes at least a selection of an orchestrator engine from a plurality of orchestrator engines to execute each control in the list of controls, dynamically generate a schema based on the selected compliance type, the list of controls, and the selected orchestrator engine, automatically trigger execution of validation of each of the list of controls for the selected compliance type based on the generated schema, in response to the execution, generate results of the validation, the results including a list of non-compliant controls and a list of compliant controls, dynamically generate, via a machine learning engine, a set of remedies for fixing each of the non-complaint controls, and cause the generated set of remedies to be displayed on the user interface of the user device, wherein the set of remedies is caused to be executed or modified by the user to fix each of the non-compliant controls, and wherein the execution of validation of the list of controls is retriggered until each of the list of controls corresponding to the selected compliance type is compliant.

In an example embodiment, the results of the validation may be version controlled and secured by blockchain.

In an example embodiment, the processor may generate and display real-time recommendations for compliance types corresponding to the selected project and controls corresponding to the selected compliance type on the user interface of the user device.

In an example embodiment, the processor may generate the real-time recommendations for the compliance types by generating a similarity score for each of the compliance types with respect to the selected compliance type, and generating, via the machine learning engine, the real-time recommendations for the compliance types based on the similarity score.

In an example embodiment, to cause the list of controls to be displayed on the user interface, the processor may be to extract the list of controls corresponding to the selected compliance type from a database, wherein the database may include a mapping of the list of controls with the corresponding compliance type.

In an example embodiment, the processor may receive at least one of a custom compliance type and a custom control from the user, and dynamically define a set of controls for the custom compliance type and a set of validations for the custom control.

In an example embodiment, the set of configurations may further include at least one of a schedule of a frequency of execution for each control, a selection of a branch or environment for execution of each control, and a method for execution of each control.

In an example embodiment, the plurality of orchestrator engines may include at least one of a continuous integration tool, a continuous deployment tool, a custom tool, or an enterprise tool.

In an example embodiment, the processor may generate the schema by dynamically connecting respective configuration files with each other in a sequence to trigger the execution of the validation of each of the list of controls.

In an example embodiment, the processor may apply a cosine similarity function to identify unique non-compliant controls from the list of non-compliant controls, generate and transmit, via the machine learning engine, the set of remedies for each of the identified unique non-compliant controls to the user, wherein the set of remedies may include a root cause analysis of each of the identified unique non-compliant controls, and cause the machine learning engine to self-learn based on the set of remedies provided for each of the identified unique non-compliant controls.

In an example embodiment, the processor may identify the unique non-compliant controls by determining an angle of closeness of a first vector corresponding to a non-compliant control from the list of non-compliant controls with a second vector corresponding to an existing set of non-compliant controls, determining whether the angle is greater than or equal to a pre-configured threshold, in response to a positive determination, identifying the non-compliant control as a duplicate non-compliant control, and in response to a negative determination, identifying the non-compliant control as a unique non-compliant control.

In another aspect, the present disclosure relates to a computer-implemented method including receiving, by a processor associated with a system, from a user device associated with a user, a selection of a project in an enterprise and a compliance type corresponding to the selected project, causing, by the processor, a list of controls associated with the selected compliance type to be displayed on a user interface of the user device, receiving, by the processor, a set of configurations for each of the list of controls from the user, wherein the set of configurations includes at least a selection of an orchestrator engine from a plurality of orchestrator engines to execute each control in the list of controls, dynamically generating, by the processor, a schema based on the selected compliance type, the list of controls, and the selected orchestrator engine, automatically triggering, by the processor, an execution of validation of each of the list of controls for the selected compliance type based on the generated schema, in response to the execution, generating, by the processor, results of the validation, the results comprising a list of non-compliant controls and a list of compliant controls, dynamically generating, by the processor via a machine learning engine, a set of remedies for fixing each of the non-compliant controls, and causing, by the processor, the generated set of remedies to be displayed on the user interface of the user device, wherein the set of remedies is caused to be executed or modified by the user to fix each of the non-compliant controls, and wherein the execution of validation of each of the list of controls is retriggered until the list of controls corresponding to the selected compliance type are complaint.

In an example embodiment, the method may include receiving, by the processor, at least one of a custom compliance type and a custom control from the user, and dynamically defining, by the processor, a set of controls for the custom compliance type and a set of validations for the custom control.

In an example embodiment, the set of configurations may further include at least one of a schedule of a frequency of execution for each control, a selection of a branch or environment for execution of each control, and a method for execution of each control.

In an example embodiment, generating, by the processor, the schema may include dynamically connecting respective configuration files with each other in a sequence to trigger the execution of the validation of each of the list of controls.

In an example embodiment, the method may include applying, by the processor, a cosine similarity function to identify unique non-compliant controls from the list of non-compliant controls, generating and transmitting, by the processor via the machine learning engine, the set of remedies for each of the identified unique non-compliant controls to the user, wherein the set of remedies may include a root cause analysis of each of the identified unique non-compliant controls, and causing, by the processor, the machine learning engine to self-learn based on the set of remedies provided for each of the identified unique non-compliant controls.

In an example embodiment, identifying, by the processor, the unique non-compliant controls may include determining, by the processor, an angle of closeness of a first vector corresponding to a non-compliant control from the list of non-compliant controls with a second vector corresponding to an existing set of non-compliant controls, determining, by the processor, whether the angle is greater than or equal to a pre-configured threshold, in response to a positive determination, identifying, by the processor, the non-compliant control as a duplicate non-compliant control, and in response to a negative determination, identifying, by the processor, the non-compliant control as a unique non-compliant control.

In an example embodiment, the plurality of orchestrator engines may include at least one of a continuous integration tool, a continuous deployment tool, a custom tool, or an enterprise tool.

In an example embodiment, causing, by the processor, the list of controls to be displayed on the user interface may include extracting, by the processor, the list of controls corresponding to the selected compliance type from a database, wherein the database may include a mapping of the list of controls with the corresponding compliance type.

In another aspect, the present disclosure relates to a non-transitory computer-readable medium comprising machine-readable instructions that are executable by a processor to perform the steps of the method described herein.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 3 illustrates an example flow diagram for implementing an alert engine in a compliance system, in accordance with embodiments of the present disclosure.

FIGS. 16A-16E illustrate example representations of user interface corresponding to a compliance system, in accordance with embodiments of the present disclosure.

Figure 1:
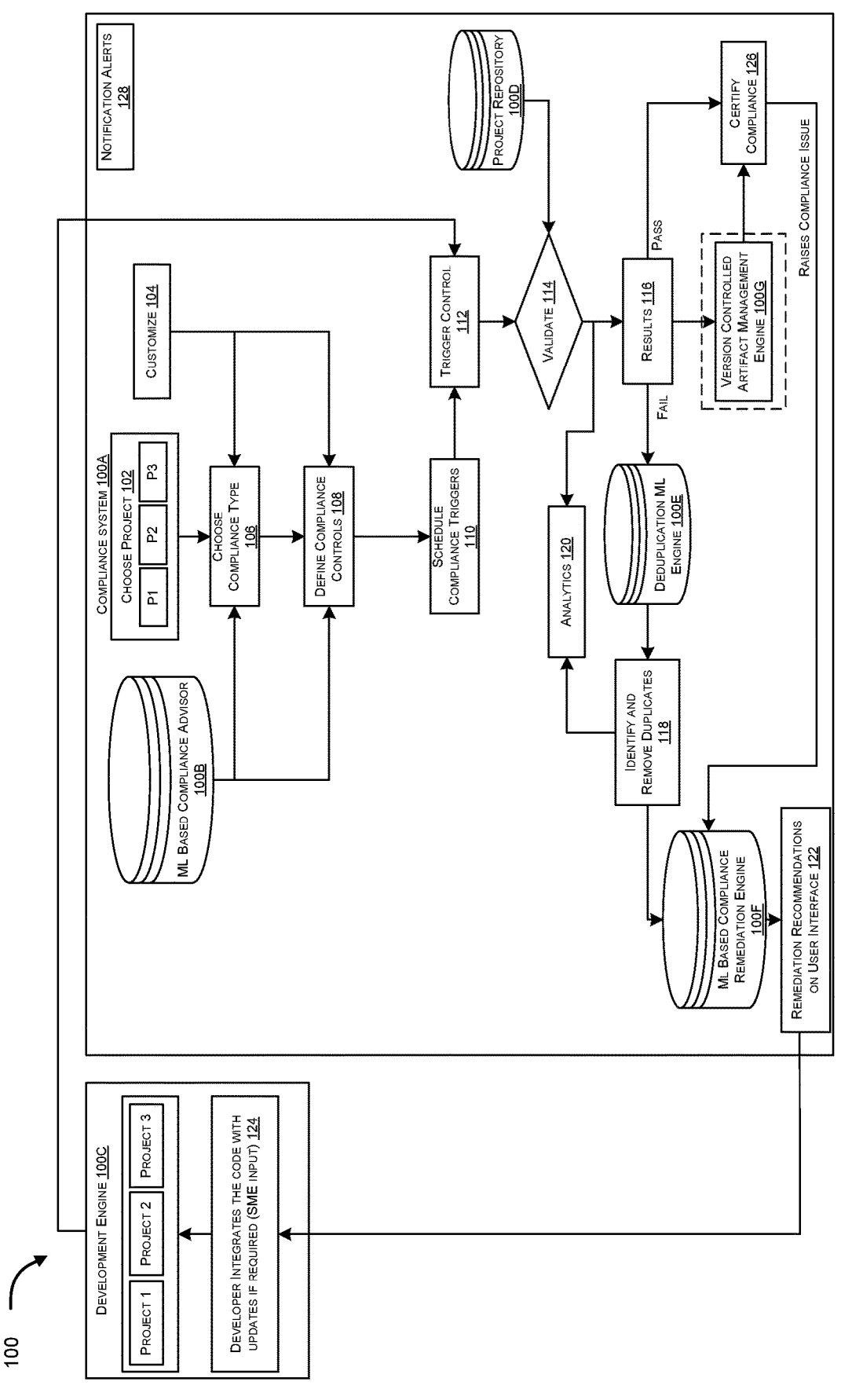
FIG. 1 illustrates an example operating environment or a network architecture in which a system such as a compliance system may be implemented to democratize compliance with customizable and extendable controls, in accordance with embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a compliance system built upon artificial intelligence and/or machine language predictions. In particular, the compliance system may dynamically generate a schema to democratize compliance in an enterprise with customizable and extendable controls. The various embodiments throughout the disclosure will be explained in more detail with reference to FIGS. 1-17.

FIG. 1 illustrates an example operating environment or a network architecture 100 in which a system 100A such as a compliance system may be implemented to democratize compliance with customizable and extendable controls, in accordance with embodiments of the present disclosure.

In this embodiment, the network architecture 100 may include a compliance system 100A including a machine learning (ML)-based compliance advisor 100B, a project repository 100D, a deduplication ML engine 100E, an ML-based compliance remediation engine 100F, and a version controlled artifact management engine 100F. The compliance system 100A may be communicatively coupled to a development engine 100C. In some embodiments, the compliance system 100A and/or the development engine 100C may be communicatively coupled to one or more computing devices (not shown) operated by one or more users or subject matter experts (SMEs). The compliance system 100A may be communicatively coupled to the computing devices via a network. In an example embodiment, the compliance system 100A may communicate with the computing devices in a secure manner via the network. The network may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fibre optic network, or some combination thereof. In particular, the network may be any network over which the user communicates with the compliance system 100A using their respective computing devices.

In an example embodiment, the computing device may refer to a wireless device and/or a user device and/or a user equipment (UE). It should be understood that the terms "computing device," "wireless device," "user device," and "user equipment (UE)" may be used interchangeably throughout the disclosure.

A wireless device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an example embodiment, the computing devices may communicate with the compliance system 100A and/or the development engine 100C via a set of executable instructions residing on any operating system. In an example embodiment, the computing devices may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from the user such as touch pad, touch enabled screen, electronic pen and the like.

A person of ordinary skill in the art will appreciate that the computing devices may not be restricted to the mentioned devices and various other devices may be used.

Referring to FIG. 1, the compliance system 100A may be implemented by way of a single device or a combination of multiple devices that may be operatively connected or networked together. The compliance system 100A may be implemented in a hardware or a suitable combination of hardware and software. In another example embodiment, the compliance system 100A may be implemented as a cloud computing device or any other device that is network connected. In another example embodiment, the compliance system 100A may be used in an on-premise environment. In an example embodiment, the compliance system 100A may implement artificial intelligence (AI) and ML prediction algorithms to democratize compliance with customizable and extendable controls.

In an example embodiment, the computing device may store and execute a client side application that presents, to the user, one or more user interfaces. The client side application may interact with a server side application or the compliance system 100A and/or the development engine 100C.

In accordance with embodiments of the present disclosure, the compliance system 100A may create a schema (or golden schema) dynamically, based on user selection and method of validation as per business requirements. It may be appreciated that the terms "schema" and "golden schema" may be used interchangeably throughout the disclosure. Referring to FIG. 1, the user, at step 102, may select a project in an enterprise where compliance checks may need to be performed. In an example embodiments, a list of projects of the enterprise may be displayed on a user interface of the computing device. Further, at step 104, the user may customize the compliance types and the controls associated with the compliance types. In an example embodiment, the user may add a compliance corresponding to the selected project. In an example embodiment, the compliance system 100A may utilize the ML-based compliance advisor 100B to recommend types of compliance for the selected project.

At step 106, a type of compliance corresponding to the selected project may be selected by the user. In an example embodiment, one or more existing compliance types may be selected or a new compliance type may be added or customized by the user. Further, at step 108, a list of controls may be listed on the user interface of the computing device based on the selected type of compliance. In an example embodiment, the user may customize the list of controls by adding or deleting the controls based on business requirements. In an example embodiment, the ML-based compliance advisor 100B may recommend controls corresponding to the selected type of compliance.

Referring to FIG. 1, at step 110, the list of controls may be scheduled to be triggered. In an example embodiment, the user may select a control from the list of controls and provide a set of configurations for each control. For example, the set of configurations may include, but not limited to, a frequency at which the control is to be triggered, a branch(s) or phase or environment in which the control is to be triggered, and a tool(s) required for performing validation on the control. In an example embodiment, one control may be configured in more than one branch. In an example embodiment, the user may select an orchestrator engine from a plurality of orchestrator engines to dynamically generate a schema for validating the controls. In an example embodiment, the compliance system 100A may dynamically generate the schema, via the selected orchestrator engine, based on the selected type of compliance and the list of controls.

Further, at step 112, the compliance system 100A may automatically trigger the list of controls to be executed based on the generated schema. In an example embodiment, on triggering the list of controls, regulatory and policy checks may be triggered. At step 114, the list of controls may be executed for validation. In an example embodiment, the compliance system 100A may use data from the project repository 100D to validate each of the list of controls.

Referring to FIG. 1, at step 116, results of execution of validation of each of the list of controls may be generated. The results may include a list of compliant controls and a list of non-compliant controls. In an example embodiment, at step 120, the generated results may be analysed. The results of analysis may be used for self-learning by the ML engines, i.e., ML based compliance advisor 100B, deduplication ML engine 100E, or ML based compliance remediation engine 100E. The compliance system 100A may display detailed metrics and provide visualization of the metrics from different tools and orchestrator engines deployed in various environments on a single plane. In an example embodiment, the results of execution of the validation and the analytics may be stored in a version controlled artifact management engine 100G. These evidences may be secured by blockchain technology, thereby making it immutable.

In accordance with embodiments of the present disclosure, if the validation of any of the list of controls may fail, the results, and as such the list of non-compliant controls may be sent to the deduplication ML engine 100E. In an example embodiment, the deduplication ML engine 100E may, at step 118, identify and remove duplicates from the list of non-compliant controls to generate a list of unique non-compliant controls. The results from the deduplication ML engine 100E, i.e. a count of unique non-compliant controls as well as the list of unique non-compliant controls may be sent further for analytics at step 120.

Further, the list of unique non-compliant controls may be sent to the ML-based compliance remediation engine 100F. In an example embodiment, the ML-based compliance remediation engine 100F may generate a set of remedies in real-time for each of the list of unique non-compliant controls for fixing the issues corresponding to the non-compliant controls. The set of remedies for each of the list of unique non-compliant controls may be sent, at step 122, to the computing device and displayed on the user interface. In an example embodiment, at step 124, the user may either directly execute the set of remedies corresponding to each of the list of unique non-compliant controls or may modify the set of remedies based on subject matter expertise to fix the non-compliant controls. Accordingly, the development engine 100C may send the fixed controls to the compliance system 100A to initiate a trigger again for revalidation. It may be noted that the compliance system 100A may trigger the execution of validation of the list of controls until all the controls may be validated successfully.

Once the list of controls may be validated, the compliance system 100A may certify compliance for each of the compliant controls at step 126. If a compliance officer, i.e., the user may find any non-compliance or issue, the ML-based compliance remediation engine 100F may be executed to generate the set of remedies for fixing the non-compliance of issue.

Referring to FIG. 1, the compliance system 100A may enable notification alerts 128 to keep the users informed on a required action to be taken or for any new addition of controls or compliance type corresponding to any project in the enterprise. In an example embodiment, the compliance system 100A may enable the notification alerts 128 for keeping the projects updated on global compliance, regulations, policies, and security. Further, real-time enterprise-level notifications may be enabled for other projects when any new compliance or control is added to a project for enterprise standardization.

Therefore, the disclosed system network architecture 100 may empower the users in the enterprise to count compliance, which may be highly customizable. The controls may be configurable as per business requirements to tighten the compliance checks at various stages of development. The disclosed system may be orchestrator agnostic, i.e. the system may allow the users to choose any orchestrator to execute the controls in real-time. The disclosed system also provides a single place (e.g., version controlled artifact management engine 100G) to maintain compliance artifacts and analytics for the entire enterprise across verticals and projects. By way of notification alerts 128, the disclosed system may standardize compliance by adding custom compliance and controls to an enterprise compliance library. Further, the disclosed system may use trained ML models (e.g., ML-based compliance advisor 100B, deduplication ML engine 100E, and ML-based compliance remediation engine 100F) to provide real-time recommendations for the type of compliance and controls based on user selection, and real-time recommendations for remediation based on issues identified in the non-compliant controls.

Although FIG. 1 shows exemplary components of the network architecture 100, in other embodiments, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
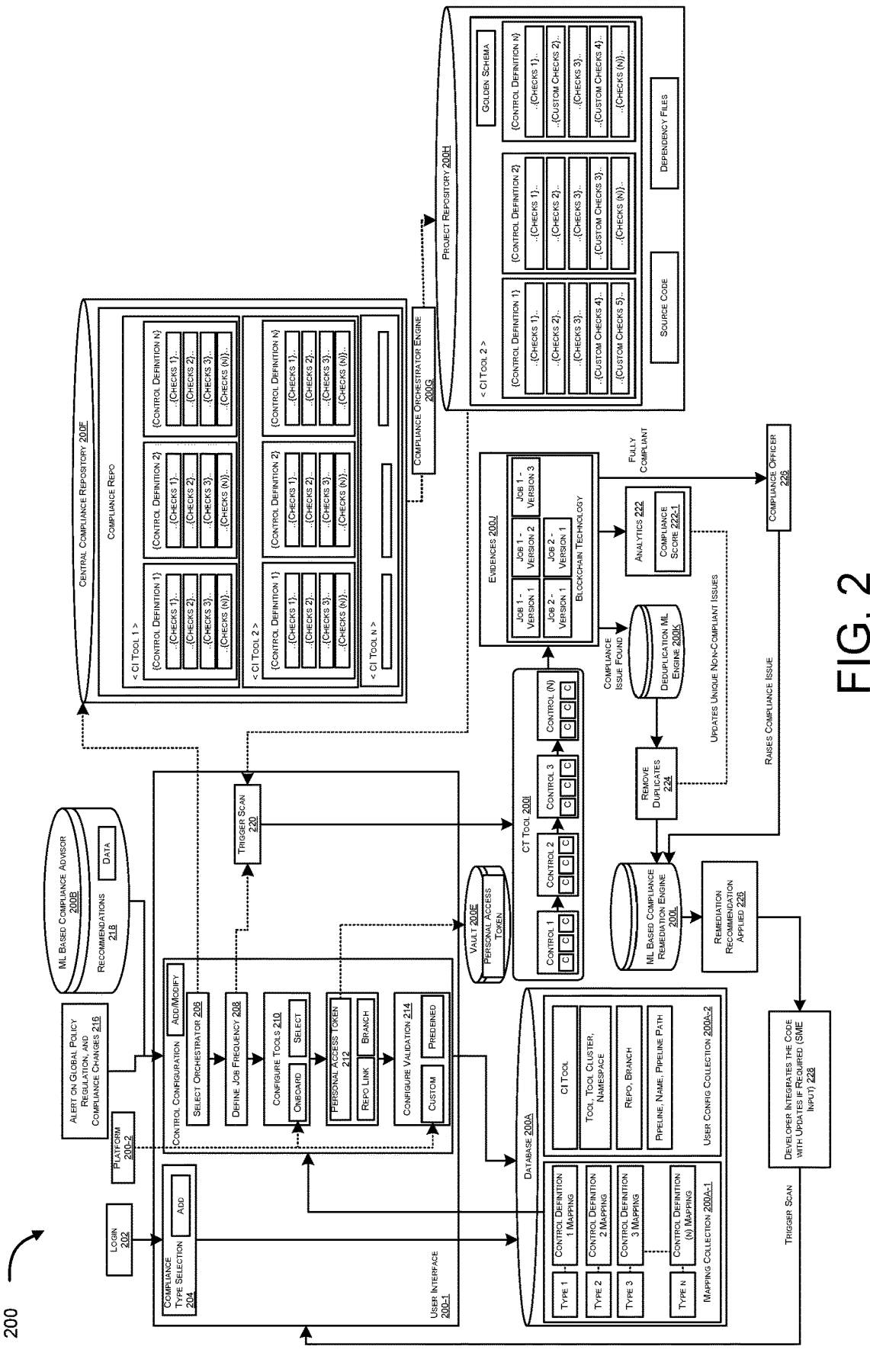
FIG. 2 illustrates an example flow diagram for democratizing compliance in an enterprise, in accordance with embodiments of the present disclosure.

FIG. 2 illustrates an example flow diagram 200 for democratizing compliance in an enterprise, in accordance with embodiments of the present disclosure.

Referring to FIG. 2, at step 202, a user of an enterprise may login to a system such as a compliance system (e.g., 100A). Once the user is logged in, a user interface 200-1 may be presented to the user via a computing device. At step 204, a type of compliance may be selected by the user. In an example embodiment, the user may select a project from a list of projects. Accordingly, the user may select the type of compliance corresponding to the selected project. In another example embodiment, the user may add a custom type of compliance corresponding to the selected project. It may be noted that compliance type may refer to different legislative acts that measure the existing security and compliance practices followed against the requirements that may need to be met. For example, compliance type may include, but not limited to, health insurance portability and accountability act (HIPAA), Sarbanes-Oxley Act (SOX), General Data Protection Regulation (GDPR), Dynamic Application Security Testing (DAST), Static Application Security Testing (SAST), etc.

The type of compliance selected by the user may be stored at a database 200A. In an example embodiment, the database 200A may include a mapping collection 200A-1 and a user configuration collection 200A-2. The mapping collection 200A-1 may include a mapping between different types of compliance and corresponding list of controls for each type of compliance. It may be noted that controls may refer to requirements codified with multiple checks and validations that may need to be satisfied. Each control may be mapped with a set of checks across compliance, security, policies, regulation, etc. in a unique manner. Every check may be codified, with each check comprising of multiple scenarios for the validation. The entire mapping of compliance type and controls may be defined in the database 200A. Further, the user configuration collection 200A-2 may include a set of configurations corresponding to the type of compliance and the list of controls such as, but not limited to, tools, tool cluster, branch or phase, etc. According to the selected type of compliance, the database 200A may retrieve corresponding list of controls from the mapping collection 200A-1 and corresponding set of configurations from the user configuration collection 200A-2. The user interface 200-1 may display the list of controls to the user for the user to configure. In an example embodiment, the user may add or modify the list of controls. For example, for a compliance type Client Data Protection (CDP), password management may be a control to validate password management. For this control, there may be several checks such as, but not limited to, password length check, password exposure check, password rotation check, etc.

Referring to FIG. 2, the user, at step 206, may select an orchestrator engine from a plurality of orchestrator engines based on the selected type of compliance and the list of controls. In an example embodiment, at step 208, the user may define a frequency at which each control is to be triggered. Further, at step 210, the user may configure tools either by selecting the tools or onboarding the tools via a platform 200-2. Furthermore, at step 212, the user may assign a personal access token, i.e., may reference a repository link or define a branch or phase or environment for execution of each control. In an example embodiment, the personal access token may be encrypted and stored in a vault 200E. At step 214, the user may configure validation jobs for each control such that the user may select a method for execution of each control. In an example embodiment, the user may select any one of predefined validation jobs for each control, or may add a custom validation job via the platform 200-2. In an example embodiment, these set of configurations may be stored at the database 200A as user configuration collection 200A-2.

In an example embodiment, the compliance system 100A may configure the list of controls for the selected type of compliance based on any alert in global policy, regulation, and compliance changes at step 216. In an example embodiment, the compliance system 100A may include an ML-based compliance advisor 200B implementing trained ML algorithms. For example, at step 218, the ML-based compliance advisor 200B may provide real-time recommendations on compliance types based on the selected project, and on controls based on the selected type of compliance. It may be appreciated that the ML-based compliance advisor 200B may be similar to the ML-based compliance advisor 100B of FIG. 1 in its functionality.

Referring to FIG. 2, based on the orchestrator engine and the method of execution selected by the user, a schema may be dynamically generated based on a central compliance repository 200F. The central compliance repository 200F may refer to a compliance repository, i.e., a source repository that may contain control configuration files corresponding to different orchestrator engines (or tools). These control configuration files may contain validations codified making it flexible and extendable. Accordingly, based on the selected orchestrator engine and corresponding control configuration files, the compliance system 100A may dynamically generate a schema and store the schema in a project repository 200H via a compliance orchestrator engine 200G. The project repository 200H may refer to a repository where the schema may be dynamically generated based on user selection of the set of configurations for each control and the orchestrator tool or engine. The schema may be a unification of multiple orchestrator templates that may be generated dynamically in real-time and that may be executed during different phases of life cycle of development in an automated manner. The compliance orchestrator engine 200G may dynamically generate compliance controls with environment and orchestrator configuration in real-time based on user selection for automated validations. In an example embodiment, when the user may select a control and an orchestrator engine to execute the control, the respective validations associated with it may be cloned to the project repository 200H.

Further, at step 220, execution of validation of each control of the list of controls may be triggered based on the generated schema. The selected orchestrator engine or compliance tool 200I may validate each control, and store results of the validation as evidences in a version controlled artifact management engine 200J. The results may be generated in the form of a list of compliant controls and a list of non-compliant controls. In an example embodiment, the results may be provided for analytics at step 222. Based on the analytics 222, a compliance score may be assigned to each control. In an example embodiment, the compliance score may be compared to identify issues in non-compliant controls. In an example embodiment, the list of non-compliant controls may be provided to a deduplication ML engine 200K. The deduplication ML engine 200K may identify unique non-compliant controls by removing duplicate non-compliant controls from the list of non-compliant controls at step 224. It may be appreciated that the deduplication ML engine 200K may be similar to the deduplication ML engine 100E of FIG. 1 in its functionality.

Referring to FIG. 2, the unique non-compliant controls may be provided to an ML-based compliance remediation engine 200L. The ML-based compliance remediation engine 200L may generate recommendations, at step 226, including a set of remedies for fixing the non-compliant controls. In an example embodiment, the ML-based compliance remediation engine 200L may use publicly available data and organization data to generate the recommendations. The ML-based compliance remediation engine 200L may generate the recommendations for a fix whenever there may be occurrence of non-compliant issues, using the issues as a prompt. It may be noted that the ML-based compliance remediation engine 200L may be a self-learning system, which learns whenever the correct fixes recommended by the engine 200L is used by a user. It may be appreciated that the ML-based compliance remediation engine 200L may be similar to the ML-based compliance remediation engine 100F of FIG. 1 in its functionality. In an example embodiment, the set of remedies may be transmitted to the computing device and displayed on the user interface 200-1 for the user to fix the non-compliant controls. For example, at step 228, the user may either directly execute the set of remedies for each non-compliant control or may modify the set of remedies accordingly to fix the non-compliant controls. Based on the fix, the user may trigger the execution of revalidation of the controls until all the controls are validated.

Referring to FIG. 2, the list of compliant controls may be sent for certification to a compliance officer at step 226. In some example embodiments, the compliance officer 226 may raise an issue in any control, after which the ML-based compliance remediation engine 200L may be triggered to generate the set of remedies to fix the issue.

Therefore, the compliance system 100A validates the compliance type by validating all the controls and checks for the selected project.

FIG. 3 illustrates an example flow diagram 300 for implementing an alert engine in a compliance system, in accordance with embodiments of the present disclosure.

In an example embodiment, an alert engine may be implemented in a compliance system (e.g., 100A) to provide notification alerts (e.g., 128 or 216) to keep users updated on the latest policies, regulations, and compliance requirements. Referring to FIG. 3, at step 302, amendments to global regulations, policies, and compliance requirements may be continuously tracked by an organization's legal team. These amendments may be updated in the organization legal, compliance, and regulation library frequently, at step 304. Further, at step 306, the compliance system may include project-level policies. At step 308, the project-level policies may be compared with organization-level policies. In such a scenario, the alert engine may determine, at step 310, whether the project-level policies may need to be updated. In response to a positive determination, the latest updates may be notified in form of alerts to stay compliant with the organization-level policies, at step 312. For example, based on the alerts, the user and/or the compliance system 100A may update the project-level policies. In response to a negative determination, the alert engine may not take any action 314, and continue to monitor the global regulations, policies, and compliance amendments.

Therefore, the alert engine may facilitate a custom program interface that may poll the organization library and alert the user on updates. This helps the user to incorporate all the latest amendments to stay compliant and secure.

Figure 4:
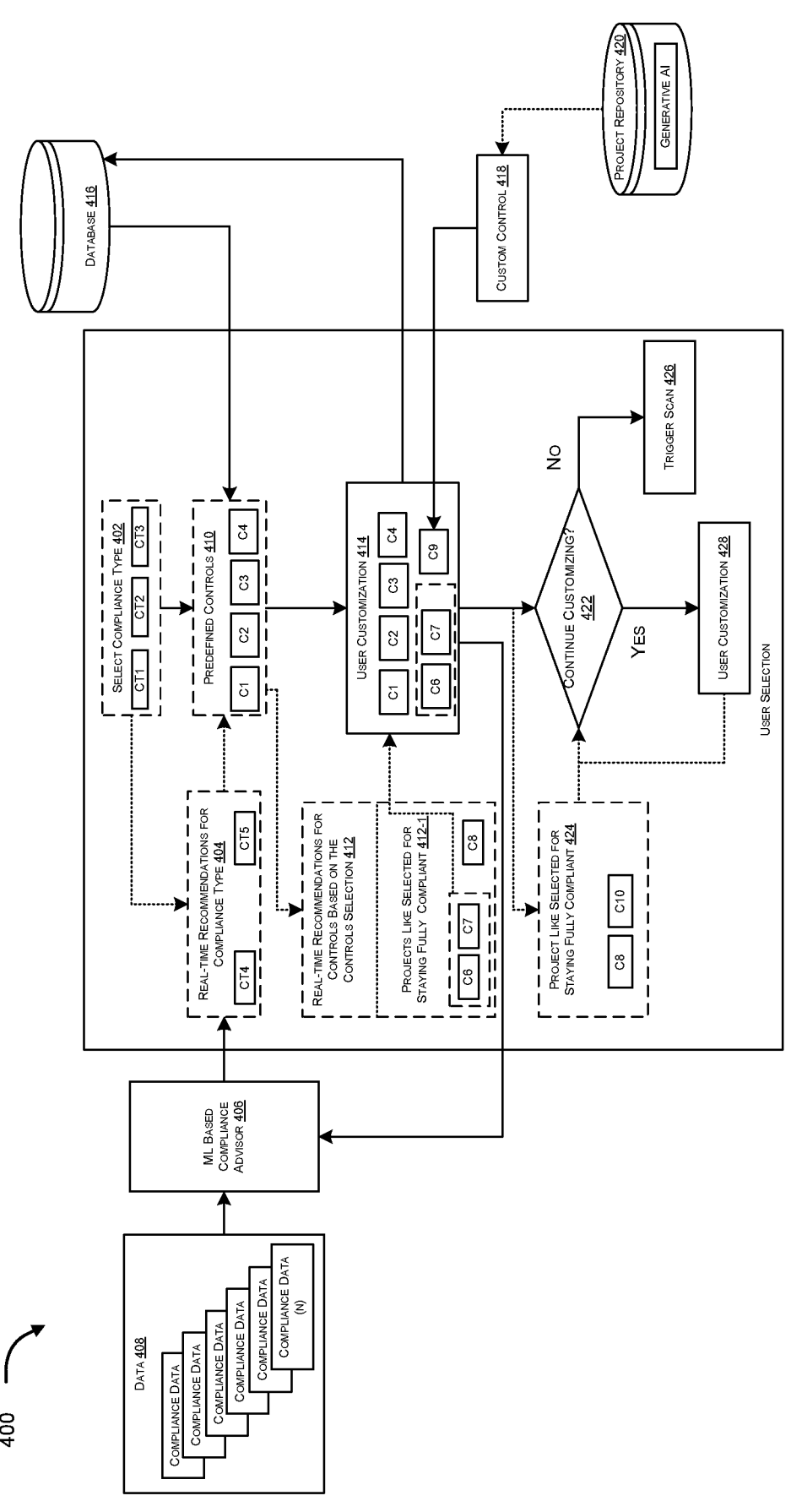
FIG. 4 illustrates an example representation for implementing a machine learning (ML)-based compliance advisor in a compliance system, in accordance with embodiments of the present disclosure.

FIG. 4 illustrates an example representation 400 for implementing an ML-based compliance advisor in a compliance system, in accordance with embodiments of the present disclosure.

Referring to FIG. 4, at step 402, a type of compliance may be selected by a user based on a project selected in an enterprise. At step 404, an ML-based compliance advisor 406, based on past stored data 408, may provide real-time recommendations for compliance types based on the project selected by the user. For example, the disclosed compliance system (e.g., 100A) may provide CT1, CT2, and CT3 as compliance types to select from based on the selected project. The ML-based compliance advisor 406 may provide the real-time recommendations of CT4 and CT5 to the user. Accordingly, the user may select the type of compliance from among CT1 to CT5.

Further, at step 410, a list of predefined controls may be extracted from a database 416 and presented to the user on a user interface of a computing device. The list of predefined controls may be based on the type of compliance selected by the user. In an example embodiment, the ML-based compliance advisor 406 may also provide real-time recommendations for the controls based on the selected type of compliance. In an example embodiment, the user may select the controls from the list of predefined controls, and the ML-based compliance advisor 406 may provide the real-time recommendations based on the selected controls. The real-time recommendations of the list of controls may be based on similar projects as selected by the user 412-1. For example, the compliance system 100A may extract the list of controls C1 to C4 from the database 416. The ML-based compliance advisor 406 may provide the recommendations as C6, C7, and C8. The user may select all the predefined controls and C6 and C7 from the real-time recommendations.

Referring to FIG. 4, at step 414, the user may perform customization on the selected list of controls. In an example embodiment, the user may provide a set of configurations for each of the selected controls. The user configurations may be stored at the database 416. In an example embodiment, a project repository 420, as discussed herein, may use generative AI to generate a schema corresponding to the selected controls. At step 418, the user may customize the control and add a new control, for example, C9. These new set of selected controls may be used by the ML-based compliance advisor 406 to self-learn and enhance the recommendations provided. In an example embodiment, based on the new set of selected controls (e.g., C1 . . . . C4, C6, C7, C9), the ML-based compliance advisor 406 may provide real-time recommendations for the controls to stay fully compliant in the enterprise. For example, the ML-based compliance advisor 406 may provide the updated recommendations as C8 and C10.

Therefore, it may be understood, that the ML-based compliance advisor 406 may dynamically generate and provide recommendations for the compliance type and the set of controls in real-time while the user may customize and extend controls.

Referring to FIG. 4, at step 422, the compliance system 100A may prompt the user to continue customizing. The user may continue to customize the list of controls at step 428. Else, the compliance system 100A may trigger scan for each selected control based on the set of configurations.

In an example embodiment, the ML-based compliance advisor 406 may use content-based filtering or collaborative-based filtering techniques. The content-based filtering technique may be based on content and past behavior of selections. The content may be described as various features or characteristics that may be considered for the initial set of recommendations. For example, the content for compliance domain may include, but not be limited to, industry like finance, healthcare, technology, human resources, etc., region like Europe, United States, Asia, etc., categories like application, data, hosting, cloud infrastructure, etc., and tribe level for enterprise organizations. As an example, the ML-based compliance advisor 406 may be trained using industry/domain specific compliance requirements like HIPAA for healthcare, Payment Card Industry (PCI) and SOX for finance, GDPR for Europe clients, and the like, internal compliance requirements for an organization, and requirements specified by a compliance officer (or user) and stored in the database. In an example embodiment, the database may include a database, a data lake, a data fabric, or a data center.

In an example embodiment, the ML-based compliance advisor 406 may be trained with data (e.g., 408) used across projects along with the latest compliance checks that may need to be in place depending on the amendments at global level and organization level. The ML-based compliance advisor 406 may collect the user data based on clicks that create a utility matrix from user preferences and draw relationships. Based on these learnings and historic data, the ML-based compliance advisor 406 may provide real-time recommendations focused on suggesting similar compliance types and controls to the user.

In an example embodiment, for every compliance type selection by the user, the real-time recommendations of what other compliance types were selected by similar projects may be displayed. This may create an awareness of best practices followed and allow the projects to meet compliance requirements followed in the industry, and may empower developers by creating awareness to make sure that the standards are met early in the software development life cycle to bring enterprise standardization. Similarly, for every control selection, the real-time recommendations may be suggested which may help projects to stay fully compliant and give ready to use controls, which may also be customized. For every new control added to define the various checks/validations, generative AI may be leveraged. This may help in quickly generating the test cases in real-time. Every customization (i.e., addition of compliance type or control) may be appended in the database 416, as discussed above, which may be added to the training data for subsequent training and model building, thereby improving the self-learning system and results for better recommendations.

Example Use Case

Considering an example use where users 1-5 may have selected various compliance types. The below table 1 shows the various compliance types and regions where they may be applicable. Further, the below table 2 shows past user selections.

TABLE 1

| User | Finance | Healthcare | Retail |
|------|---------|------------|--------|
| 1 | SOX | HIPAA | PCI-DSS |
| 2 | SOX | | PCI-DSS |
| 3 | | GDPR | PCI-DSS |
| 4 | | HIPAA | PA-DSS |
| 5 | SOX | | PCI-DSS |

TABLE 2

| Compliance Types | US | Europe | Asia | APAC |
|------------------|-----|--------|------|------|
| SOX | Yes | | | |
| HIPAA | Yes | | | |
| GDPR | | Yes | | |
| PCI-DSS | Yes | Yes | Yes | Yes |
| PA-DSS | Yes | Yes | Yes | Yes |

Based on table 2, if a user may select SOX, then its dependencies or characteristics may be analyzed using various methods like, but not limited to, vector space method or classification method to achieve a score to determine the similarities. Based on the user preferences, a score may be determined using matrix factorization, which may be used to provide the recommendations to the users. Since User 1, User 2, and User 5 who have chosen SOX have also chosen PCI-DSS, the ML-based compliance advisor (e.g., 406) may recommend PCI-DSS which may have a higher score along with HIPAA as well as shown in the past selections. A similar method may be followed for providing recommendations for controls in real-time based on user selection.

Figure 5:
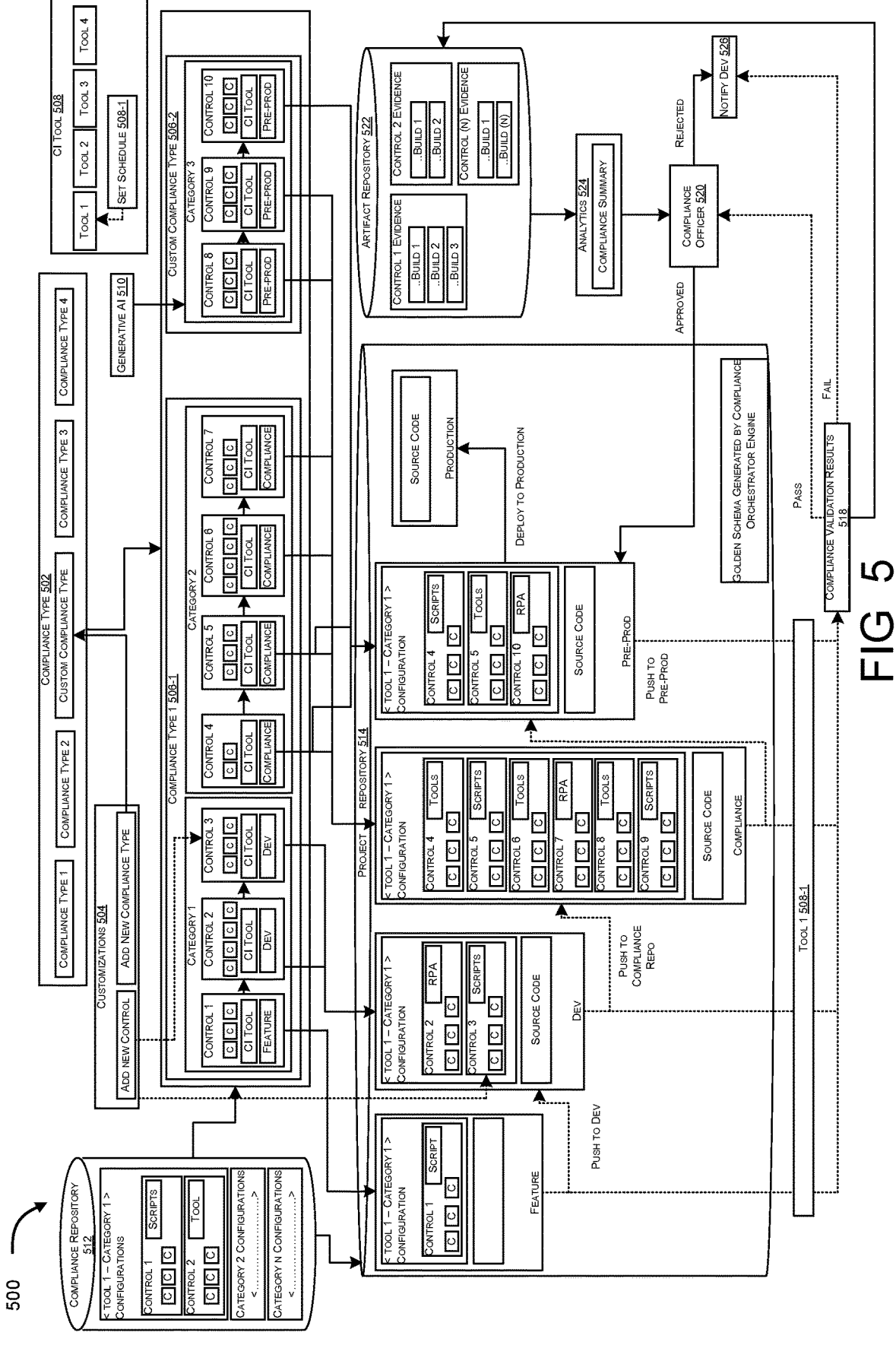
FIG. 5 illustrates an example representation of customizing compliance types and controls for validation in an automated manner, in accordance with embodiments of the present disclosure.

FIG. 5 illustrates an example representation 500 for customizing compliance types and controls for validation in an automated manner, in accordance with embodiments of the present disclosure.

In an example embodiment, a compliance system (e.g., 100A) may use a single compliance tool or compliance orchestrator engine for automated and early compliance validation, as depicted in FIG. 5.

Referring to FIG. 5, a compliance type 502 may be selected by a user from among a list of compliance types. For example, the user may select compliance type 1. In an example embodiment, the user may make customizations 504, and may add a new custom compliance type 506-2. Further, for the compliance type selected 506-1, the compliance system 100A may extract a list of predefined controls from a compliance repository 512. In an example embodiment, the user may make customizations 504 for the controls, and may add a new custom control for the compliance type selected 506-1. In an example embodiment, the user may add custom controls for the new custom compliance type 506-2. The user may use generative AI 510 to customize and define the controls required for the compliance type selected 506-1 and/or the custom compliance type 506-2.

Referring to FIG. 5, for any control, which may be new or existing, validations may be tailored by the user in a project repository 514. In an example embodiment, Category 1, Category 2, and Category 3 may represent any of the layers like application, data, application programming interface (API), identity access management (IAM), network, cloud and hosting, documentation, process and procedures, people, environment and health, security, and the like. Each category may contain multiple controls, and each control may contain multiple checks. Each control may be executed via a method, that is, tool, script, robotic process automation (RPA), etc. Alternatively, all the checks in a control may also be executed either by a tool, script, or RPA.

In an example embodiment, the user may configure each control by scheduling a frequency of execution for each control, choosing an orchestrator engine from a plurality of orchestrator engines 508 to execute various validations or checks, defining a branch or environment where the control may be executed, choosing a method required for executing a control or a validation, and the like. Based on these configurations for each control, the respective configuration files for the selected orchestrator engine 508-1 and method (e.g., tool, script, RPA, or any custom method) may be dynamically selected and cloned to the project repository 514.

Once any new code may be committed in a specific branch, based on the environment (like development, pre-production, production, etc.) and control mapping (e.g., which control is mapped to which environment, orchestrator, etc.), the respective controls may be executed in an automated way based on a schema generated in the project repository 514. The validation results may be version controlled and stored in an artifact repository 522. A folder for each control may be created in the artifact repository 522 and all the data (of builds or execution) may be stored in the respective folders. The artifacts may be protected with blockchain or other similar immutable technologies bringing in an evidence-based solution. The data from the artifacts may be extracted and reported in analytics 524, which may be a unified view of metrics from all the orchestrators and all the environments.

Once all the validations may be successful, the reports may be reviewed by a compliance officer 520 from the dashboard 524. This may simplify the manual effort of logging into multiple environments and logging into each orchestrator and analyzing the reports. In an example embodiment, the generated compliance validation results 518 may be reviewed by the compliance officer 520. If the results may be approved by the compliance officer 520, the respective code of the project may be deployed to production. If the results may be rejected by the compliance officer 520 due to, for example, any non-compliance or issue, a developer or a user may be notified 526 to fix the non-compliance or issue in the controls. For example, the ML based compliance remediation engine may provide the recommendations to the user, where the user may use the recommendations as is, or make modifications to remediate the non-compliance or issue in the controls.

Figure 6:
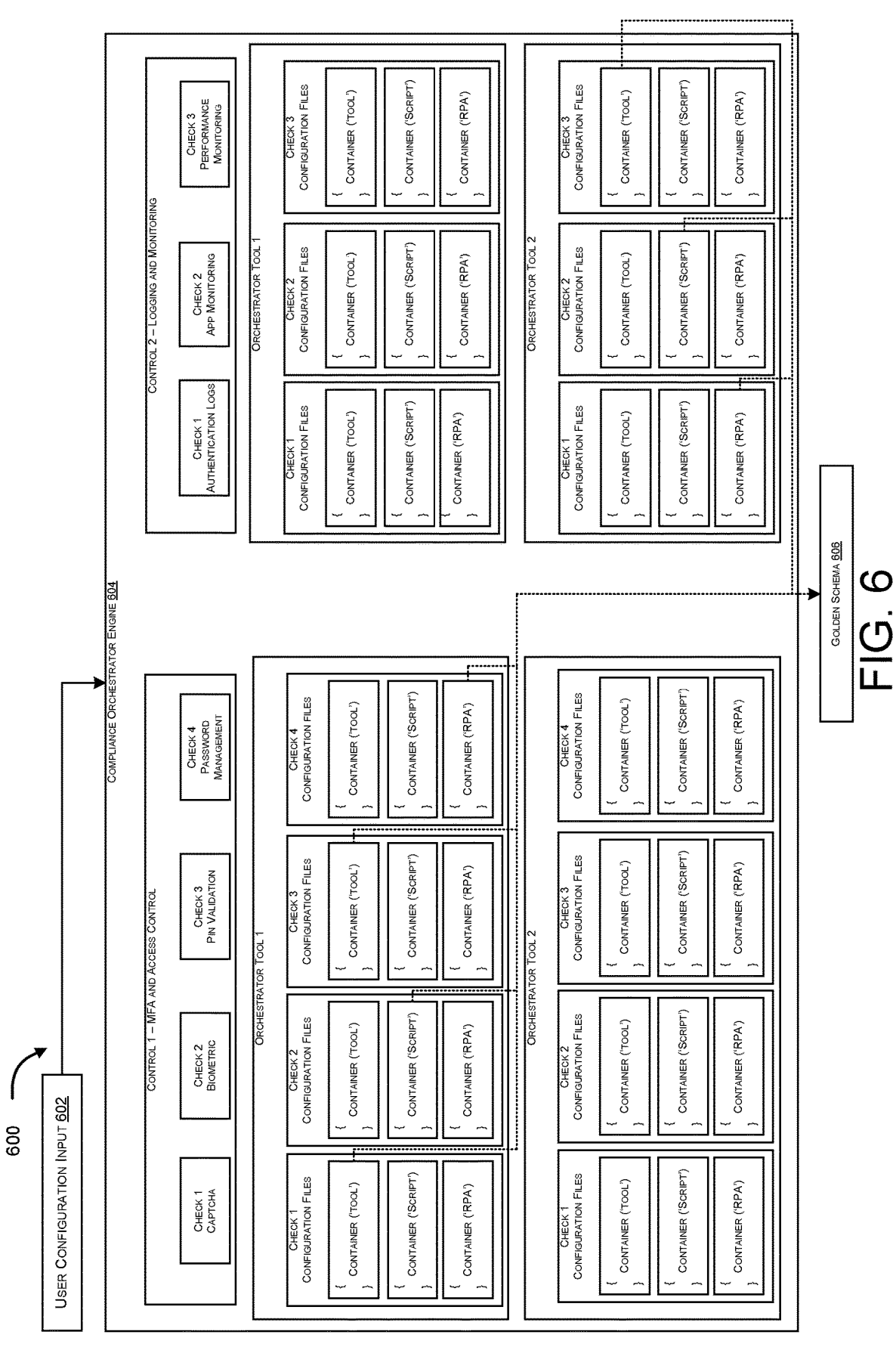
FIG. 6 illustrates an example representation of dynamically generating a schema based on user selection, in accordance with embodiments of the present disclosure.

FIG. 6 illustrates an example representation 600 of dynamically generating a schema based on user selection, in accordance with embodiments of the present disclosure.

As an example, there may be two controls, multi-factor authentication (MFA) and access control that may contain four validations or checks, and logging and monitoring that may contain three validations of checks, as depicted in FIG. 6. Each of these checks may be performed by one or more methods, i.e. tool, script, RPA, etc. It may be noted that there may be more methods that may be used to do the validations/checks.

In an example embodiment, to execute the checks in a sequence without any human intervention, one or more tools may be configured with one or more controls. In this use case, Tool 1 and Tool 2 have been considered, which may be a continuous integration tool, a continuous deployment tool, a custom tool, or any other tool, for control validation. It may be noted that the disclosed solution may be easily integrated with any tool based on the requirements. For each of these tools and the methods, the configuration files may be written from scratch and stored in a compliance repository. Based on the user selection or configuration input 602, the respective file/module may be dynamically connected with each other in a sequence to execute the control validation. In an example embodiment, based on a compliance orchestrator engine 604 selected by the user, a schema 606 may be dynamically generated inside a project repository, as discussed herein, to perform validations and checks for each control. The generated schema 606 may be customized further as per the business requirements at any stage. The schema may be executed as per a schedule across multi-tier architecture (i.e., multiple layers like cloud, application, data, infrastructure, API, database, network, etc.) defined by the user to validate the controls.

Figure 7:
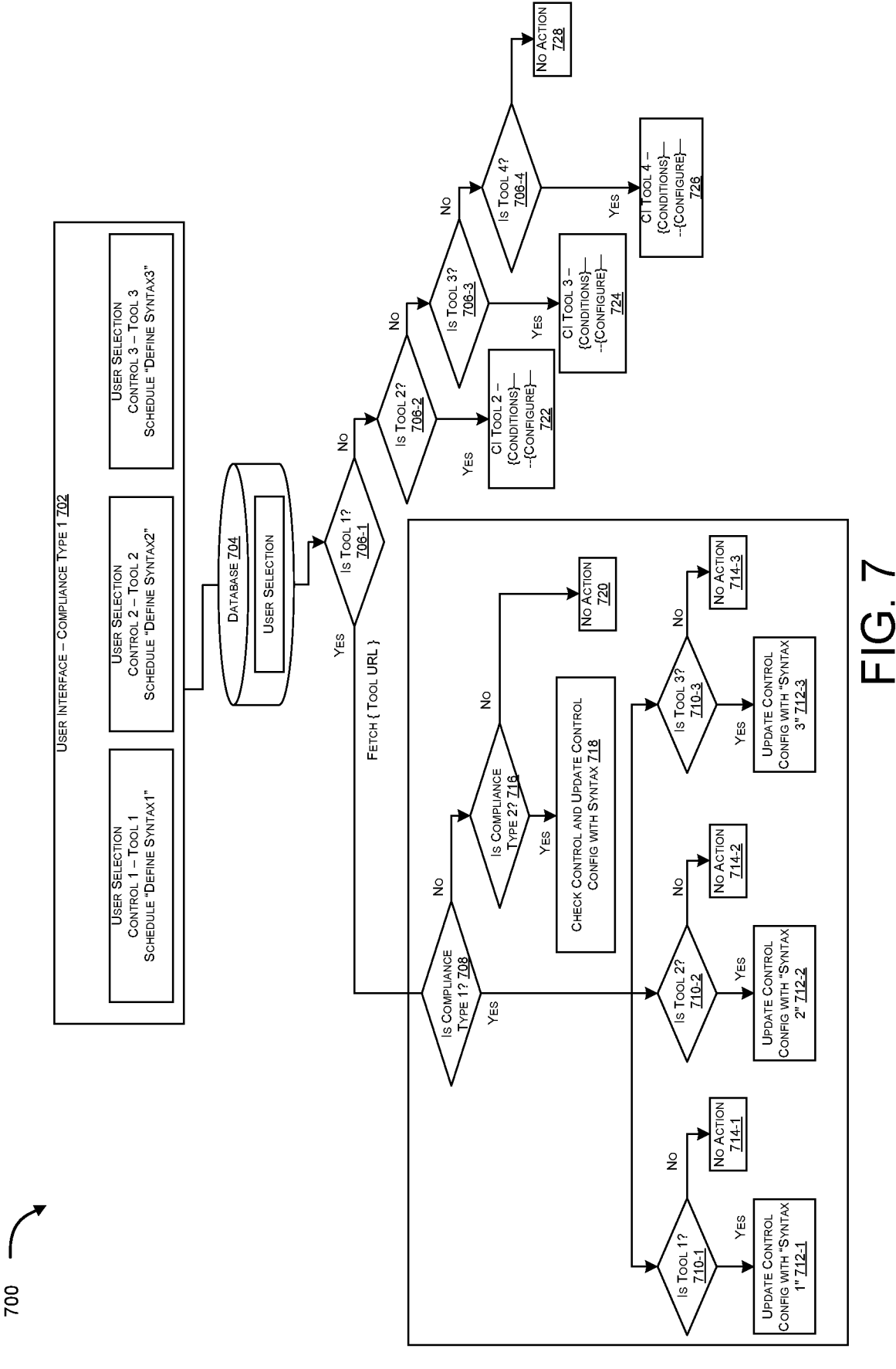
FIG. 7 illustrates an example representation for configuring a schedule to automatically execute validations, in accordance with embodiments of the present disclosure.

FIG. 7 illustrates an example representation 700 for configuring a schedule to automatically execute validations, in accordance with embodiments of the present disclosure.

In an example embodiment, a schedule may be defined by a user in a user interface to be configured in respective tools or orchestrator engines seamlessly for automated execution.

As an example, at step 702, the user may select compliance type 1 which may have three controls configured with multiple tools or orchestrator engines for executing checks corresponding to each control, as depicted in FIG. 7. For example, control 1 may be configured with tool 1 (orchestrator engine 1) in which syntax 1 may define the frequency scheduled for executing control 1, control 2 may be configured with tool 2 (orchestrator engine 2) in which syntax 2 may define the frequency for executing control 2, and control 3 may be configured with tool 3 (orchestrator engine 3) in which syntax 3 may define the frequency for executing control 3. It may be appreciated that although three controls have been depicted in FIG. 7, there may be any number of controls configured for each compliance type for same or different orchestrators.

Further, at step 704, the user selections may be stored in a database. Based on the tool or orchestrator engine selected by the user, the respective tool's uniform resource locator (URL) may be fetched from the database. Referring to FIG. 7, at step 706-1, a compliance system (e.g., 100A) may determine if tool 1 is selected by the user. Similarly, at each step 706-2, 706-3, and 706-4, the compliance system 100A may determine the respective tool selected by the user. If tool 2 is selected by the user, at step 722, the control configurations may be checked and updated. If tool 3 is selected by the user, at step 724, the control configurations may be checked and updated as per the selected tool 3. If tool 4 is selected by the user, at step 726, the control configurations may be checked and updated as per the selected tool 4. Else, the compliance system 100A may take no action 728.

If tool 1 is selected by the user, at step 708, the compliance system 100A may check if the tool 1 corresponds to compliance type 1 selected by the user. For the compliance type 1, the compliance system 100A may check the corresponding tools selected by the user for each control at steps 710-1, 710-2, and 710-3. Accordingly, the compliance system 100A may update control configurations with corresponding syntax based on the tool selected by the user at steps 712-1, 712-2, and 712-3 for executing the controls. Else, the compliance system 100A may take no action 714-1, 714-2, and 714-3.

Further, the compliance system 100A may check if the tool 1 corresponds to another compliance type, for example, compliance type 2 at step 716. Accordingly, at step 718, the compliance system 100A may check controls and update the control configurations with corresponding syntax to execute the controls. Else, the compliance system 100A may take no action 720.

Therefore, in accordance with embodiments of the present disclosure, a custom code or API may be written from scratch that may check the compliance type and the control for which the frequency may have to be updated (from the list of all selected compliance types and respective controls available/defined in the orchestrator engine), and update the schedule set by the user in the respective tool for the respective compliance type and control automatically.

Figure 8:
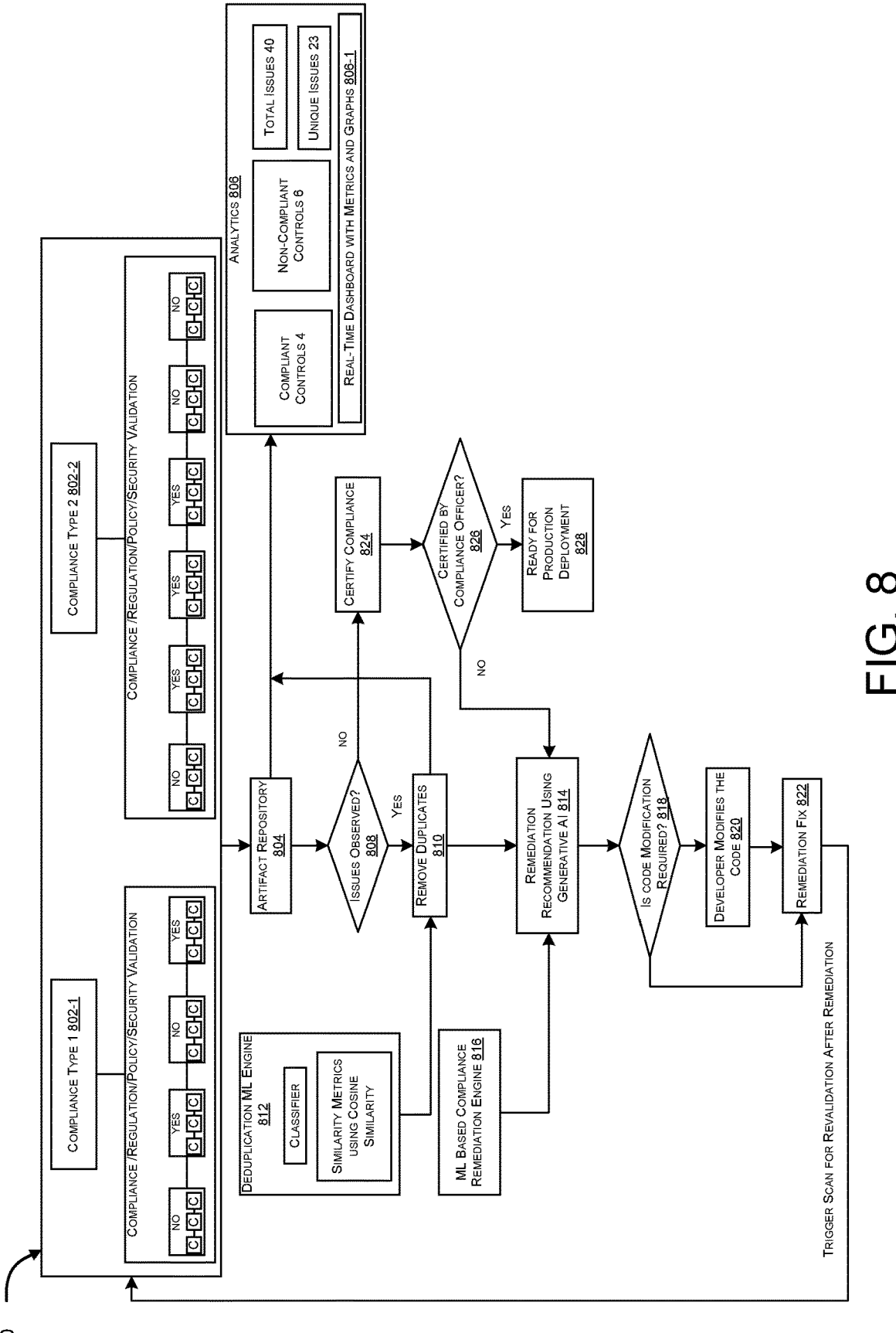
FIG. 8 illustrates an example representation for implementing a deduplication ML engine and an ML-based compliance remediation engine in a compliance system, in accordance with embodiments of the present disclosure.

FIG. 8 illustrates an example representation 800 for implementing a deduplication ML engine and an ML-based compliance remediation engine in a compliance system, in accordance with embodiments of the present disclosure.

As discussed herein, controls corresponding to each compliance type 802-1 and 802-2 may be triggered, and various checks for each control may be executed and validated. All the results may be stored in an artifact repository 804. Further, all the results may be provided to an analytics engine 806. The analytics engine 806 may display real-time dashboard with metrics and graphs 806-1 including a list of compliant controls, a list of non-compliant controls, total issues, and total unique issues. If any issues may be captured as part of the validation, then an alert mechanism may be incorporated for immediate action by a developer or user. These issues may be tracked as part of the analytics with the count of total compliant and non-compliant controls.

Referring to FIG. 8, a compliance system (e.g., 100A) may determine whether there may be any issues in the results of validation 808. For example, the results may include a list of compliant controls and a list of non-compliant controls, if there may be any issues. Further, a deduplication ML engine 812 may facilitate the compliance system 100A to remove duplicates 810 from the list of non-compliant controls. The deduplication may be performed on the non-compliant issues. The deduplication ML engine 812 may use cosine similarity algorithm based on the context of the issues to perform deduplication and identify unique issues. Based on the unique issues identified, an ML-based compliance remediation engine 816 may provide real-time remediation recommendations 814 using generative pre-trained transformer models. In an example embodiment, the real-time remediation recommendations may include root cause analysis (RCA) and remedies in the form of relevant code to fix the non-compliant issues. In an example embodiment, the ML-based compliance remediation engine 816 may be trained using the publicly available data on the Internet and data available in an organization. The ML-based compliance remediation engine 816 may be a transformer model that may be built using deep learning and neural network trained on a large number of parameters. Therefore, when a non-compliance issue may be identified, it may be fed to the ML-based compliance remediation engine 816 as an input that may prompt a solution, i.e., a code to fix the issue or a procedure to be followed to resolve the issue. The ML-based compliance remediation engine 816 may be a self-learning engine, where the fixation provided may be used as-is or modified to solve the compliance issue.

In an example embodiment, if there may be no issues in the results of validation, the compliance may be sent for certification to a compliance officer 824. If the compliance may be approved by the compliance officer 826, the code may be sent for production deployment 828. However, if the compliance may be rejected by the compliance officer 826, the ML-based compliance remediation engine 816 may provide real-time recommendations for fixing the issues identified by the compliance officer. This loop may continue until all checks of all controls for the compliance types may have been validated.

Referring to FIG. 8, the user may determine whether any modification may be required for the real-time remediation recommendations 818 corresponding to each of the identified unique non-compliant issues or controls. If there may be any modification required, the user may modify the code corresponding to the remediation recommendation 820. However, if there may be no modification required, the remediation recommendations may be directly applied to fix the identified unique non-compliant issues or controls 822. The fixation modified by the developer or user may be fed back to the ML-based compliance remediation engine 816 that may learn from the data provided by the user. Once the non-compliant issues may be fixed, the compliance system 100A may trigger the scan for validation of the controls again in order to validate the updated or fixed controls.

Figure 9:
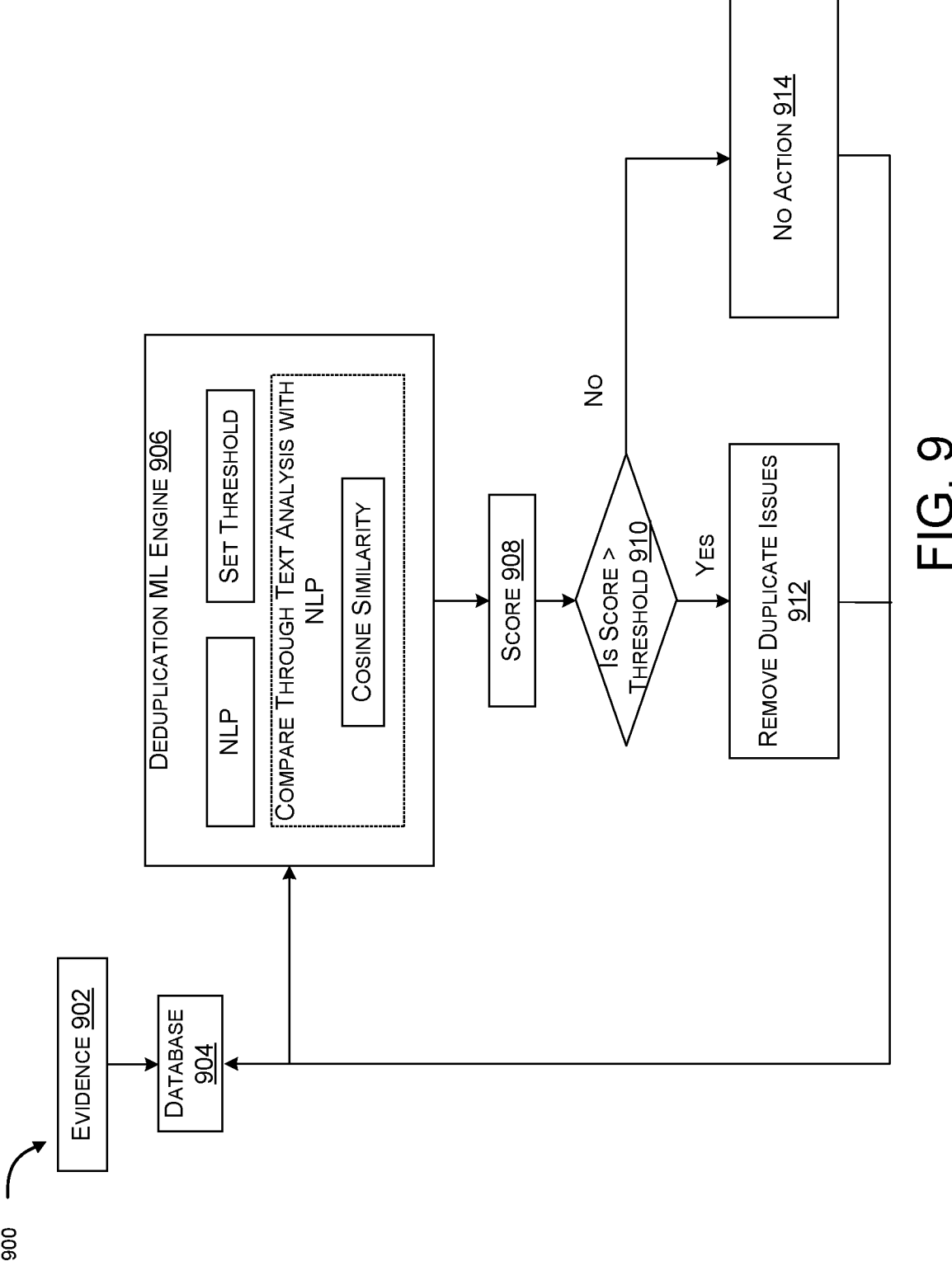
FIG. 9 illustrates an example representation for implementing a deduplication ML engine, in accordance with embodiments of the present disclosure.

FIG. 9 illustrates an example representation 900 for implementing a deduplication ML engine, in accordance with embodiments of the present disclosure.

In an example embodiment, results of validation may be stored in the form of evidences 902 in a database 904. Further, the evidences may undergo preprocessing based on applying natural language processing (NLP) techniques at a deduplication ML engine 906. The deduplication ML engine 906 may perform semantic analysis to determine a relationship between independent terms in a specific context. In an example embodiment, the deduplication ML engine 906 may use a cosine similarity algorithm to generate and assign a score 908 (metrics) with respect to how close the new input (vector 1—compliance issue) may be with an existing set of non-compliant issues (vector 2). In an example embodiment, the deduplication ML engine 906 may measure an angle between the two vectors to determine the similarity of text.

Further, the scores may be compared against a preconfigured threshold 910. In an example embodiment, the preconfigured threshold may be set through iterative experimentation to avoid generalization and improve accuracy. If the score may be greater than the preconfigured threshold, then the vectors may be considered as similar. Accordingly, the similar issues may be considered as duplicates and may be removed 912. Else, no action 914 may be taken and the issue may be considered as a unique issue.

Therefore, the deduplication ML engine 906 may facilitate in determining a unique set of non-compliant controls or issues, thereby avoiding all duplicate issues that may have been generated from multiple controls or compliance types.

Figure 10:
FIG. 10 illustrates an example representation for implementing an ML-based compliance remediation engine, in accordance with embodiments of the present disclosure.

FIG. 10 illustrates an example representation 1000 for implementing an ML-based compliance remediation engine and a mechanism for self-learning, in accordance with embodiments of the present disclosure.

In an example embodiment, when any unique issues may be observed 1002, an ML-based compliance remediation engine 1006 may provide a set of real-time remediation recommendations 1004. The ML-based compliance remediation engine 1006 may generate the set of real-time remediation recommendations using generative AI.

In an example embodiment, the real-time remediation recommendations (e.g., first remediation recommendation 1006-1) may be used directly by a user to fix the issues. Alternatively, in an example embodiment, the real-time remediation recommendations may be modified by a user 1012. Further, execution of validation of the controls may be triggered again 1008-1 based on fixing the issues. If the result of validation corresponding to the issues may be fixed 1010-1, the results may be stored and compared in a database 1006-2. However, if the issue 1010-1 may still exist, then the ML-based compliance remediation engine 1006 may generate real-time remediation recommendations (e.g., second remediation recommendation 1006-2) to be executed to fix the issues. A trigger 1008-2 may be initiated again and if the issues 1010-2 may be resolved, the loop may continue 1014 to validate controls and checks.

Therefore, the continuous feedback may help the ML-based compliance remediation engine 1006 to learn about the best remediation for improving the recommendations.

Figure 11:
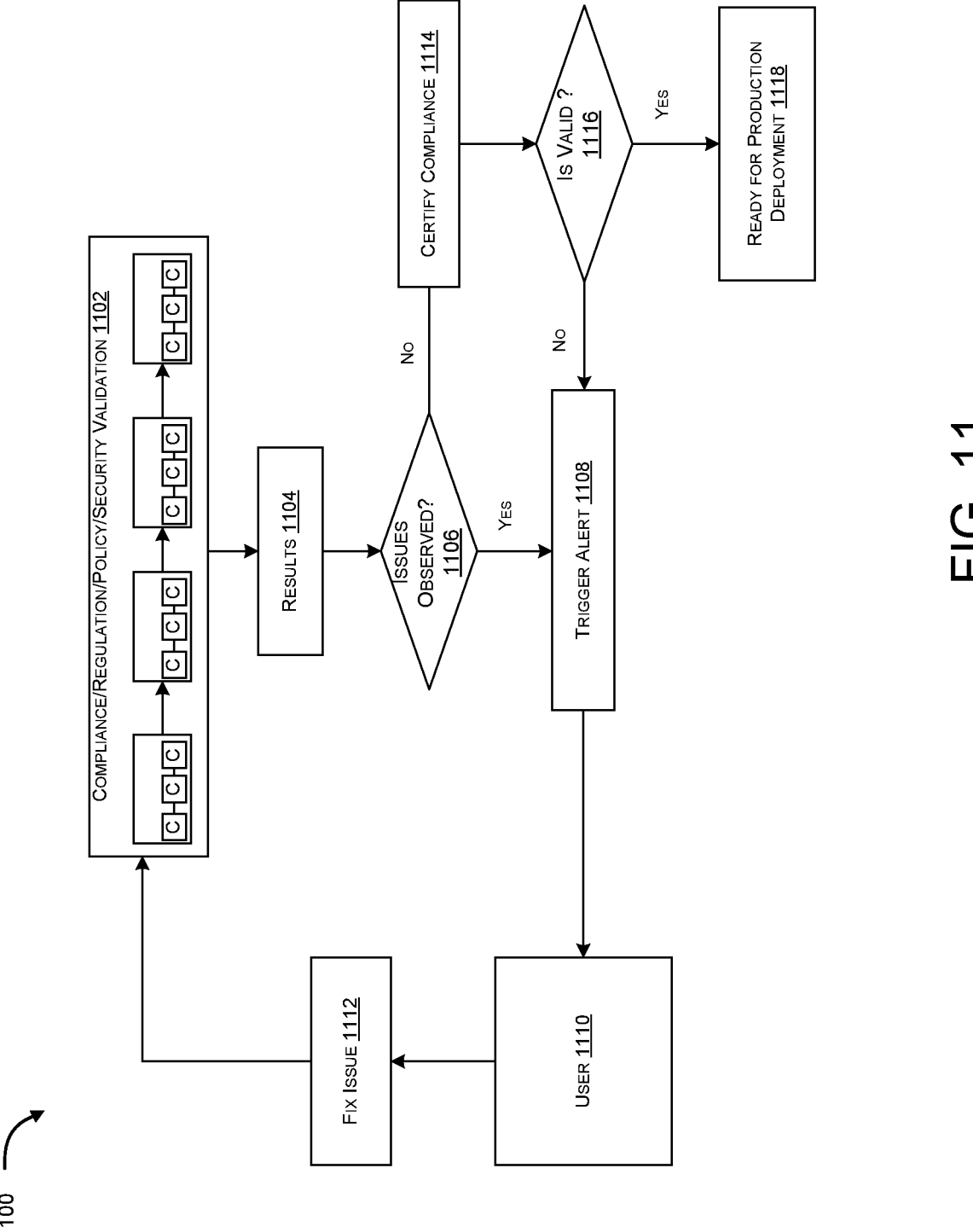
FIG. 11 illustrates an example representation for generating notification alerts to users, in accordance with embodiments of the present disclosure.

FIG. 11 illustrates an example representation 1100 for generating notification alerts to users, in accordance with embodiments of the present disclosure.

Referring to FIG. 11, once checks for all controls may have been validated 1102, the results 1104 may be examined to determine whether there may be any non-compliant controls. If there may be any issues 1106, a notification alert 1108 may be triggered to a developer or user 1110. The user 1110 may fix the issue 1112 and trigger revalidation. This may help in compressing the cycle of fixing the issues and performing revalidations.

Similarly, if there may be no issues 1106, the compliance may be sent for certification 1114. If the compliance may be certified 1116, the corresponding code may be ready for production deployment 1118. However, if the compliance may not be certified 1116 and any issue may be identified, a notification alert may be triggered 1108 for the user 1110 to fix the issue 1112 and revalidate.

Figure 12:
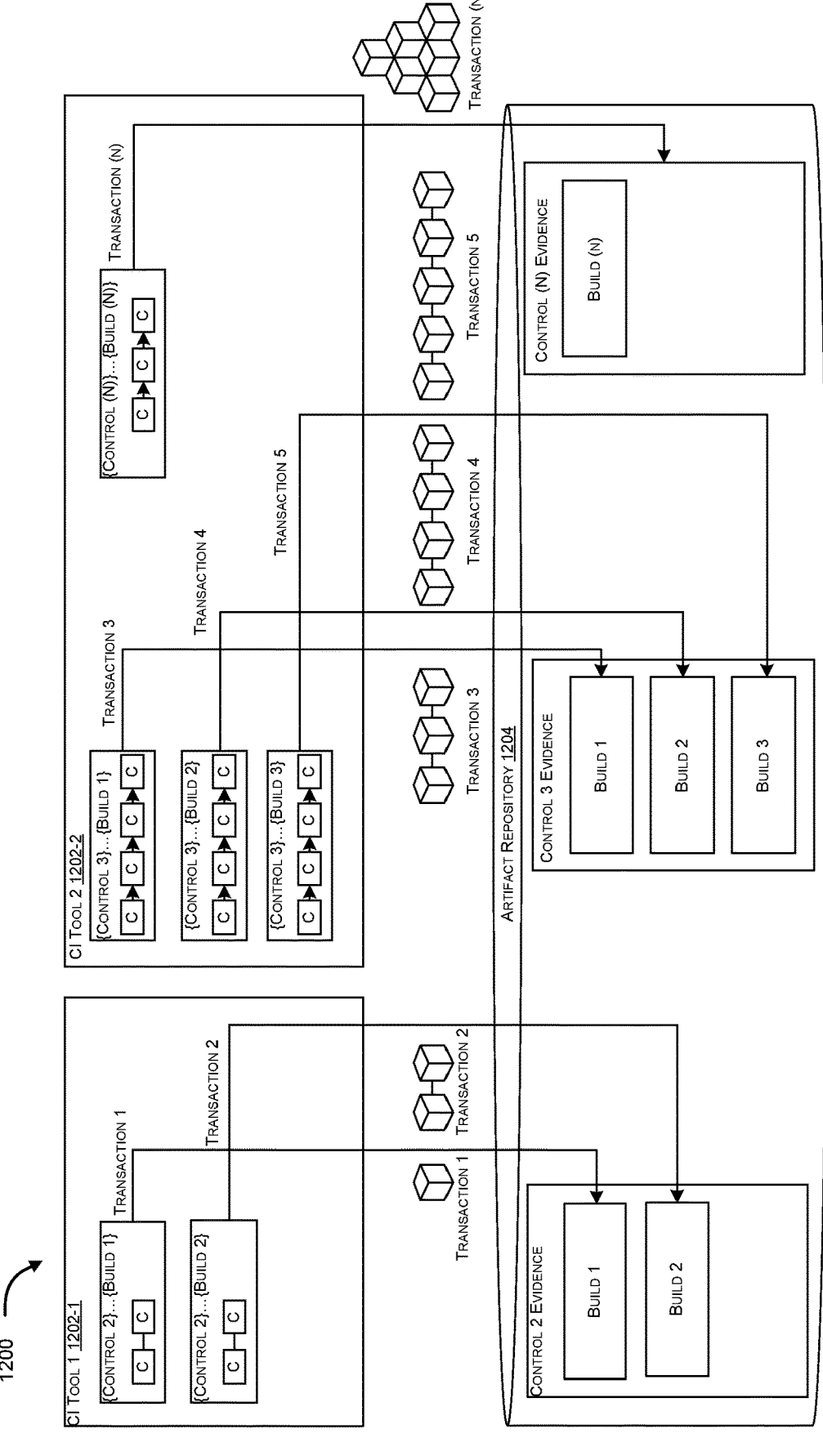
FIG. 12 illustrates an example representation for implementing an artifact repository in a compliance system, in accordance with embodiments of the present disclosure.

FIG. 12 illustrates an example representation 1200 for implementing an artifact repository in a compliance system, in accordance with embodiments of the present disclosure.

In an example embodiment, once controls may be triggered for validation, results of validation may be stored in an artifact repository 1204 and may be protected leveraging blockchain technology. As depicted in FIG. 12, there may be two tools or orchestrator engines 1202-1 and 1202-2 for executing the controls. Irrespective of the number of tools employed, or the controls required to be executed, for every execution of a control, in an environment or connected environments, a block may be generated in the artifact repository 1204 that may be secured. Every subsequent control execution may keep on adding the blocks building a chain to keep evidences intact for the security or compliance officer to review.

Figure 13:
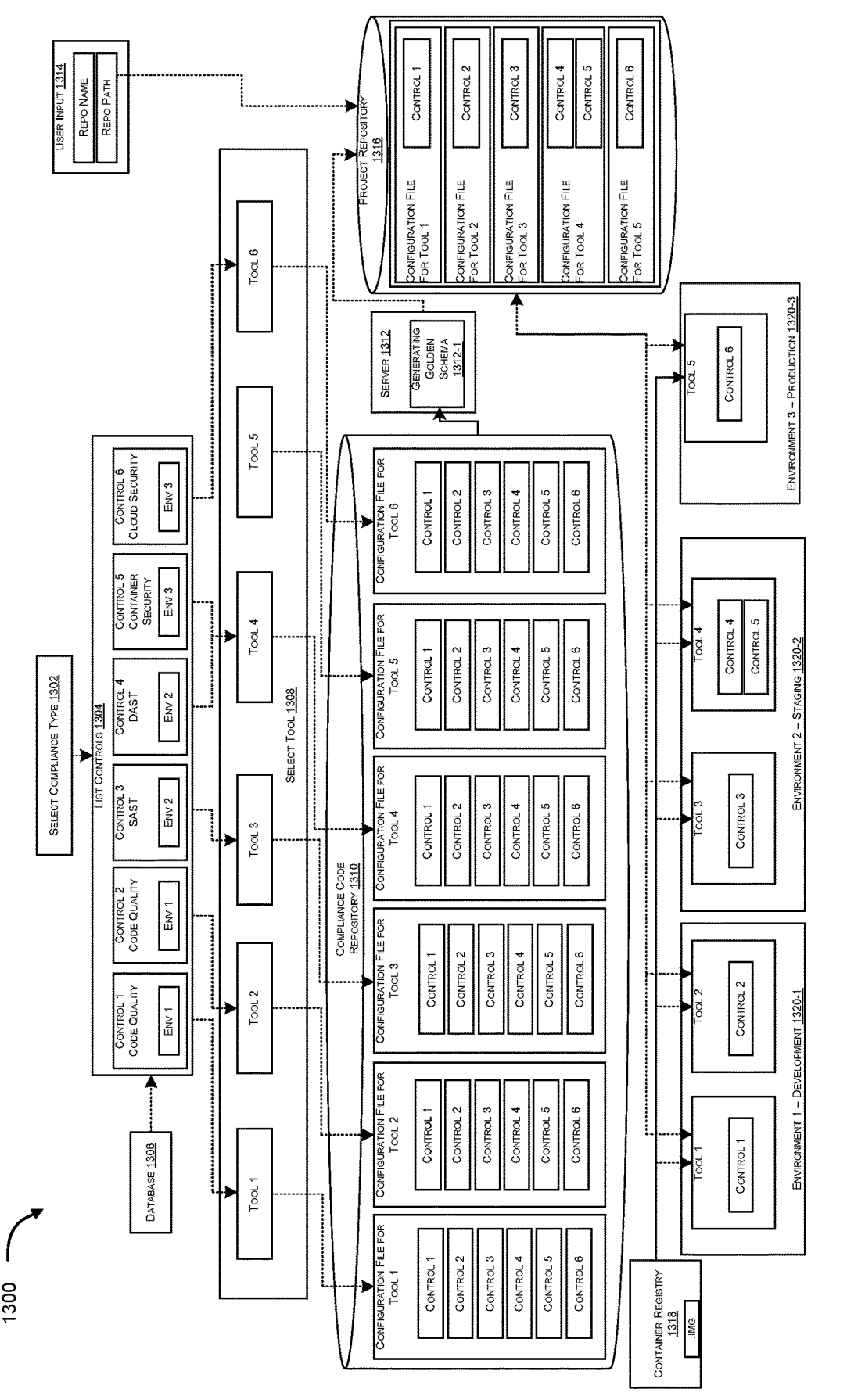
FIG. 13 illustrates an example representation of customizing compliance types and controls for validation using multiple orchestrator engines, in accordance with embodiments of the present disclosure.

FIG. 13 illustrates an example representation 1300 of customizing compliance types and controls for validation using multiple orchestrator engines, in accordance with embodiments of the present disclosure.

In particular, FIG. 13 depicts a use case scenario that may help in solving the challenges in the current market of using multiple orchestrator engines executing various compliance controls across applications, database, cloud, infrastructure, API, and multiple layers of an application, across various environments, and providing analytics on a single dashboard from all the orchestrator engines. Conventionally, a compliance officer may have to login to multiple dashboards across tools to check the status of the reports. Managing and extracting data from tools across environments may be a technical challenge leading to siloed analytics and lots of manual intervention.

Referring to FIG. 13, a compliance type 1302 may be selected by a user. Further, a compliance system (e.g., 100A) may configure a list of predefined controls 1304 from a database 1306. The user may provide a set of configurations for each control. The set of configurations may include, but not limited to, selecting an orchestrator engine from a plurality of orchestrator engines 1308 for executing each control, choosing an environment or phase for executing the control, and the like. In an example embodiment, the user may select a single orchestrator engine for executing all the controls, as explained with reference to FIG. 5. In another example embodiment, the user may select multiple orchestrator engines for executing the controls. As depicted in FIG. 13, control 1 and control 2 may be configured to be executed during development phase (i.e., environment 1) 1320-1, control 3 and control 4 may be configured to be executed in user acceptance testing or staging phase (i.e., environment 2) 1320-2, and control 5 and control 6 may be configured to be executed in production phase (i.e., environment 3) 1320-3. Further, each control may be executed by multiple tools or orchestrator engines. In an example embodiment, the orchestrator engines 1308 may include, but not be limited to, a continuous integration tool, a continuous deployment tool, a custom tool, or an enterprise tool for automating sequential or parallel processes such as, but not limited to, Azure DevOps, Bamboo, GitLab, Jenkins, Tekton, GitHub, and other such tools.

Depending on the type of tool selected 1308, the respective configuration files for different methods may be stored in a compliance code repository 1310. Further, based on the control, the tool, and method, the respective module may be selected to dynamically generate a schema (or golden schema) 1312-1 at a server 1312. The generated schema 1312-1 may be cloned in a project repository 1316. In an example embodiment, the project repository 1316 may be created automatically using custom APIs developed from scratch, based on user inputs 1314 in a user interface of a user device. Based on the user selection, the tools may be automatically deployed in the respective environments 1320-1, 1320-2, and 1320-3 from a container register 1318. In an example embodiment, when the code may be in a development environment 1320-1, the control 1 and the control 2 may be triggered to perform code quality check and open source scanning (OSS). When the code may be merged with higher environment, for example, staging environment 1320-2, various checks like SAST (control 3) and DAST (control 4) may be performed automatically on the scheduled frequency. When the code may be merged to a production environment 1320-3, container security (control

5) and cloud security (control 6) may be checked as per the defined frequency to ensure that applications are secure and complaint.

Figure 14:
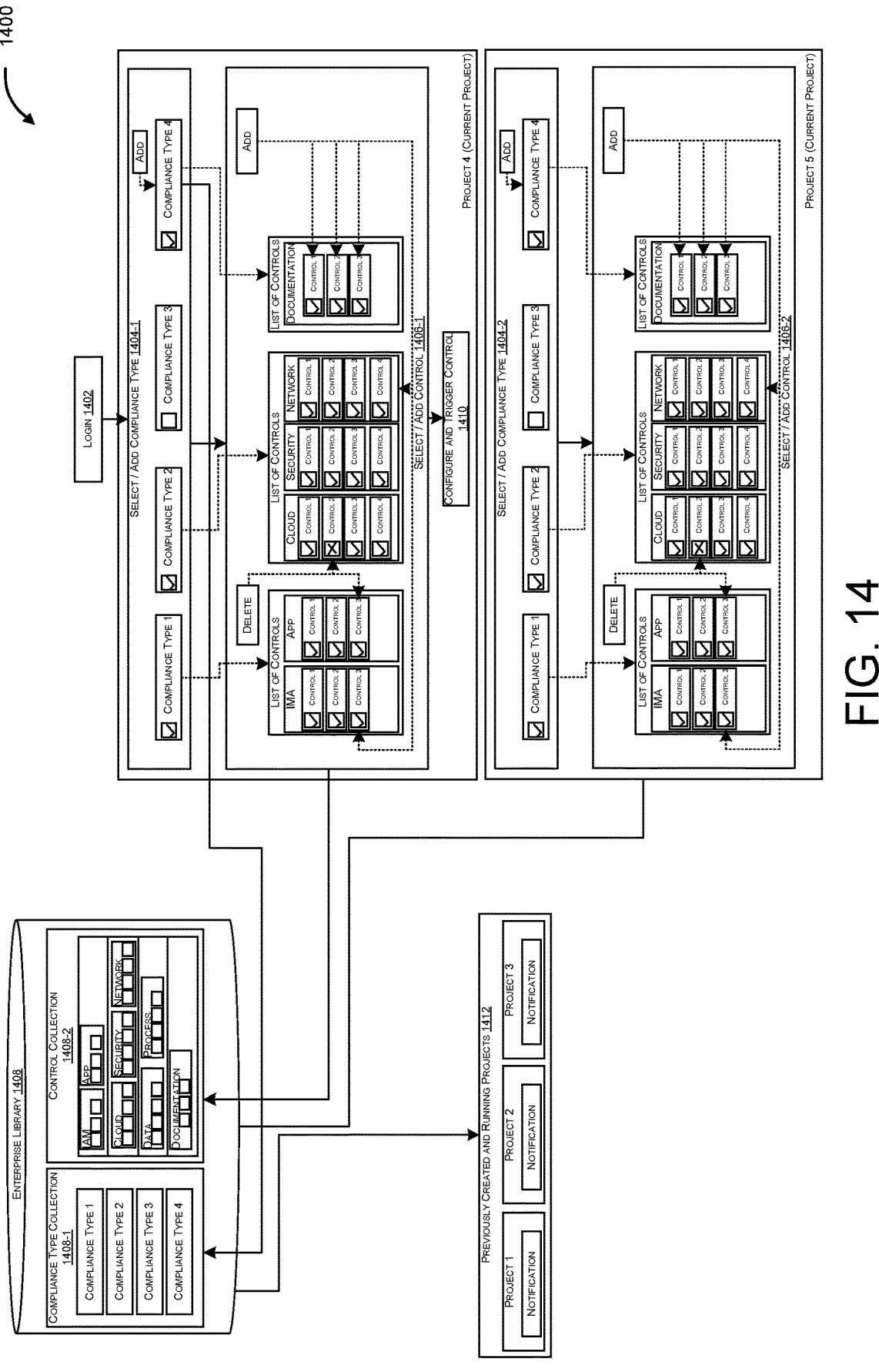
FIG. 14 illustrates an example use case representation of enterprise compliance, in accordance with embodiments of the present disclosure.

FIG. 14 illustrates an example use case representation 1400 of enterprise compliance, in accordance with embodiments of the present disclosure.

In an example embodiment, a user may login 1402 to the disclosed compliance system. At 1404-1, the user may select a compliance type or add a custom compliance for a current project (in this case, project 4). For example, the user may select compliance type 1, compliance type 2, and may add a custom compliance type 4. It may be noted that when the user may add the custom compliance type (for example, type 4), the same may be updated in an enterprise library 1408. In an example embodiment, the enterprise library 1408 may include a compliance type collection 1408-1 and a control collection 1408-2 for storing enterprise-level compliance types and controls (including checks and validations). Accordingly, when the user may add the custom compliance type, the compliance type collection 1408-1 may be updated, as depicted in FIG. 14.

Further, corresponding to the selected compliance types, at step 1406-1, the user may select a list of controls. In an example embodiment, the user may modify the predefined controls and/or may add custom controls for the selected compliance types. When the user may modify the existing controls and/or add custom controls, the control collection 1408-2 in the enterprise library 1408 may be updated. Thereafter, controls may be configured and triggered for execution of validation 1410.

Referring to FIG. 14, when the enterprise library 1408 may be updated either by way of new compliance types or modification or addition of custom controls, all projects (previously created and running) 1412 may be notified about the changes and may be reflected as already existing in the other projects. For example, the control corresponding to documentation 1406-1 may be added by the user in the project 4. This control may be updated in the enterprise library 1408, and accordingly, the other projects may be notified about the same. Therefore, as depicted in FIG. 14, the control corresponding to documentation may be visible as a predefined control in the list of controls 1406-2 of another project (in this case, project 5). Similarly, the custom compliance type 4 that may be added by the user in project 4 may be shown as a predefined compliance type 4 in project 5.

Therefore, the disclosed solution may make compliance types and controls available for every project within an enterprise, thereby bridging compliance gaps and staying updated with new global or enterprise-level regulatory, compliance, and policy amendments. Further, the disclosed solution facilitates democratization of compliance making it accessible for developers, breaking silos between compliance and development teams within the enterprise. The disclosed solution follows a trust-based approach by providing full-proof evidence for standardized and uncompromised compliance by way of an artifact repository and leveraging blockchain to make the evidences immutable. Furthermore, the disclosed solution provides an end-to-end compliance management system (i.e., compliance system) for all application layers automated through various tools and orchestrators. Additionally, the disclosed solution provides dashboard and metrics for compliance risks, compliance adherence across all tools, environments, and methods in one plane, without having a compliance officer or a developer or any individual in the enterprise to access different dashboards.

Figure 15:
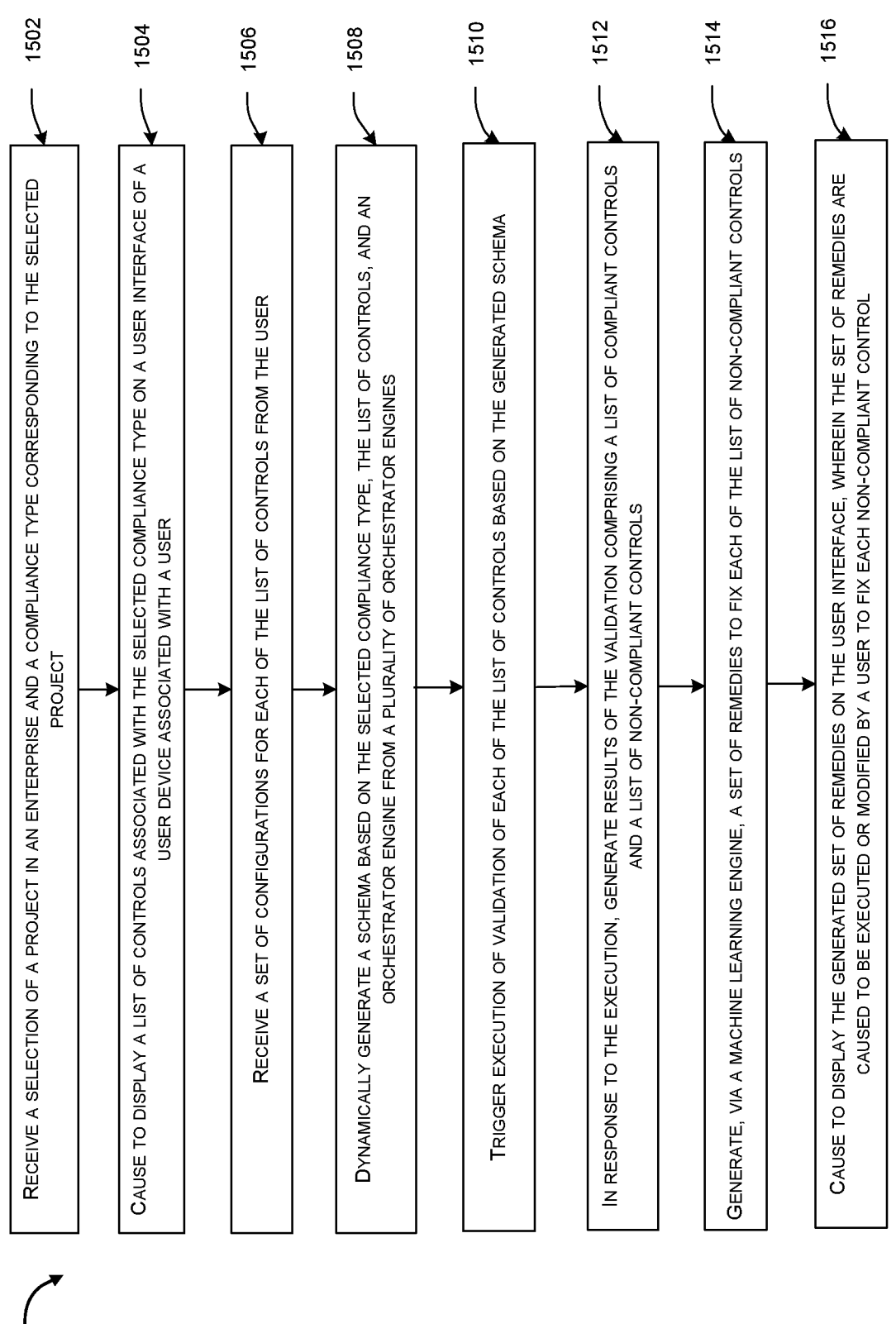
FIG. 15 illustrates an example flow chart of a method for dynamically generating a schema to democratize compliance in an enterprise with customizable and extendable controls, in accordance with embodiments of the present disclosure.

FIG. 15 illustrates an example flow chart of a method 1500 for dynamically generating a schema to democratize compliance in an enterprise with customizable and extendable controls, in accordance with embodiments of the present disclosure. It may be appreciated that the method 1500 may be performed by a compliance system, as discussed herein. In an example embodiment, the method 1500 may be performed by a processor associated with or residing within the compliance system such that the processor may be implemented as one or more microprocessors, microcomputers, microcontrollers, digital signal processors, central processing units, logic circuitries, and/or any devices that process data based on operational instructions. Among other capabilities, the processor may be configured to fetch and execute computer-readable instructions stored in a memory of the compliance system. The memory may be configured to store one or more computer-readable instructions or routines in a non-transitory computer readable storage medium, which may be fetched and executed to create or share data packets over a network service. The memory may comprise any non-transitory storage device including, for example, volatile memory such as random-access memory (RAM), or non-volatile memory such as erasable programmable read only memory (EPROM), flash memory, and the like.

Referring to FIG. 15, at block 1502, a selection of a project in an enterprise may be received by the compliance system from a user device associated with user. Further, a selection of a compliance type corresponding to the selected project may be received by the compliance system. In an example embodiment, the compliance system may cause a list of compliance types to be displayed on a user interface of the user device based on the project selected by the user. In an example embodiment, a custom compliance type may be received from the user by the compliance system.

Further, at block 1504, a list of controls (or predefined controls) associated with the selected compliance type may cause to be displayed on the user interface of the user device. In an example embodiment, the list of controls may be extracted from a database corresponding to selected compliance type. The database may include a mapping of the list of controls with the corresponding compliance types. In an example embodiment, for a custom compliance type added by the user, a set of controls may be dynamically defined by the compliance system. In an example embodiment, the user may modify the list of predefined controls and/or may add custom controls for the selected compliance type. In an example embodiment, for a custom control added by the user, a set of checks and validations may be dynamically defined by the compliance system.

Referring to FIG. 15, at block 1506, a set of configuration for each of the list of controls may be received by the compliance system from the user. In an example embodiment, the set of configurations may include, but not be limited to, a selection of an orchestrator engine from a plurality of orchestrator engines to execute validation of each of the list of controls, a schedule of a frequency at which each control is to be triggered, a selection of a branch or environment for execution of each control, and a method of execution for each control. In an example embodiment, the orchestrator engines may include, but not be limited to, a continuous integration tool, a continuous deployment tool, a custom tool, or an enterprise tool.

Further, at block 1508, a schema may be dynamically generated via the selected orchestrator engine, based on the selected compliance type and the list of controls. In an example embodiment, based on the selected compliance type, control, and the corresponding orchestrator engine, the compliance system may extract respective configuration files and dynamically generate the schema for triggering execution. In an example embodiment, the respective configuration files may be cloned in a project repository as per a schedule defined by the user for triggering execution. For example, the respective configuration files may be dynamically connected in the schema with each other in a sequence to trigger the execution of each control.

Referring to FIG. 15, at block 1510, execution of validation of each of the list of controls may be automatically triggered based on the generated schema. At block 1512, results of the validation may be generated in response to the execution. In an example embodiment, the results may include a list of compliant controls and a list of non-compliant controls. The results may be version controlled secured by blockchain technology in an artifact repository.

Further, at block 1514, a set of real-time remediation recommendations, i.e. remedies may be generated via an ML engine (i.e., an ML-based compliance remediation engine) to fix each of the non-compliant controls. In an example embodiment, the ML-based compliance remediation engine may use generative AI to generate the real-time remediation recommendations. In an example embodiment, in response to the generation of results, unique non-compliant controls may be identified from the list of non-compliant controls via another ML engine (i.e., deduplication ML engine). The deduplication ML engine may apply a cosine similarity function to identify the unique non-compliant controls. In an example embodiment, the deduplication ML engine may determine an angle of closeness (or similarity score) of a first vector corresponding to a non-compliant control with a second vector corresponding to an existing set of non-compliant controls. Further, the deduplication ML engine may determine whether the angle is greater than or equal to a pre-configured threshold. In response to a positive determination, the non-compliant control may be identified as a duplication non-compliant control and may be removed from the list of non-compliant controls generated in response to execution of validation of controls. In response to a negative determination, the non-compliant control may be identified as a unique non-compliant control. Thereafter, the unique non-compliant controls may be provided to the ML-based compliance remediation engine to generate and provide real-time remediation recommendations. In an example embodiments, the set of remedies may also include an RCA for each non-compliant control.

Referring to FIG. 15, at block 1516, the generated set of remedies may cause to be displayed on the user interface of the user device such that the remedies may cause to be executed directly or modified by the user to fix the non-compliant controls. In an example embodiment, the execution of validation may be re-triggered until all the controls are validated.

It will be appreciated that the blocks shown in FIG. 15 are merely illustrative. Other suitable blocks may be used for the same, if desired. Moreover, the blocks of the method 1500 may be performed in any order and may include additional steps.

A person of ordinary skill in the art will readily ascertain that the illustrated blocks are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

FIGS. 16A-16E illustrate example representations 1600A-1600E of a user interface corresponding to the compliance system, in accordance with embodiments of the present disclosure.

Figure 16A:
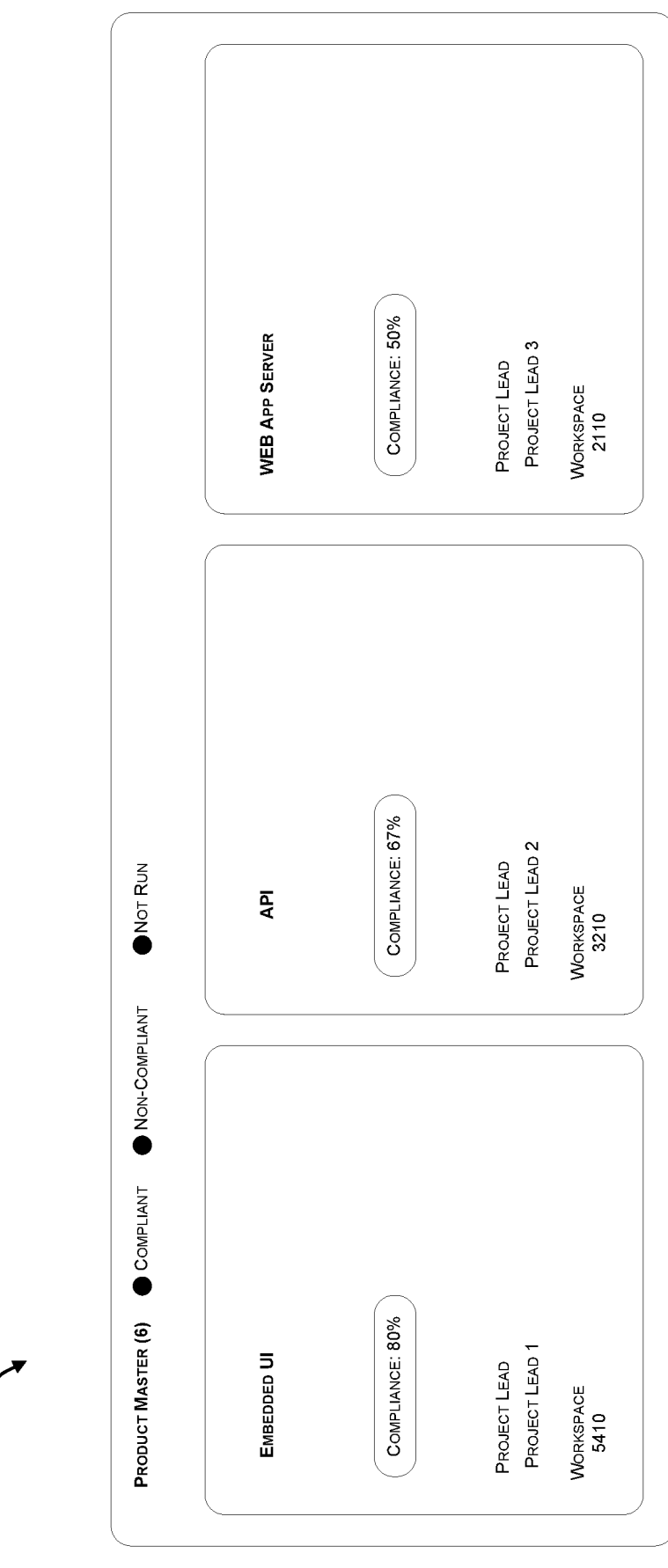

The example representation 1600A of FIG. 16A displays various projects as tiles. Each tile may give a quick view of compliance score of the project along with details of total workspaces, complaint workspaces, and non-compliant workspaces.

Figure 16B:
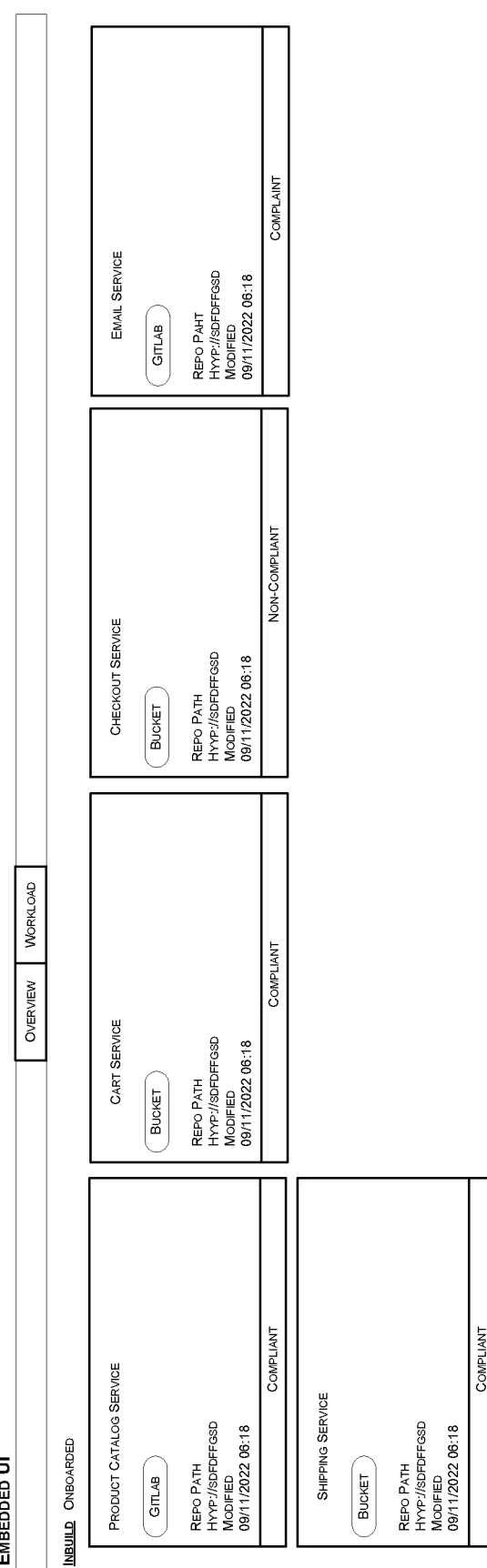

The example representation 1600B of FIG. 16B displays the workspaces of a project along with details of source code management tool, where the workspace may be available and the compliance status.

Figure 16C:
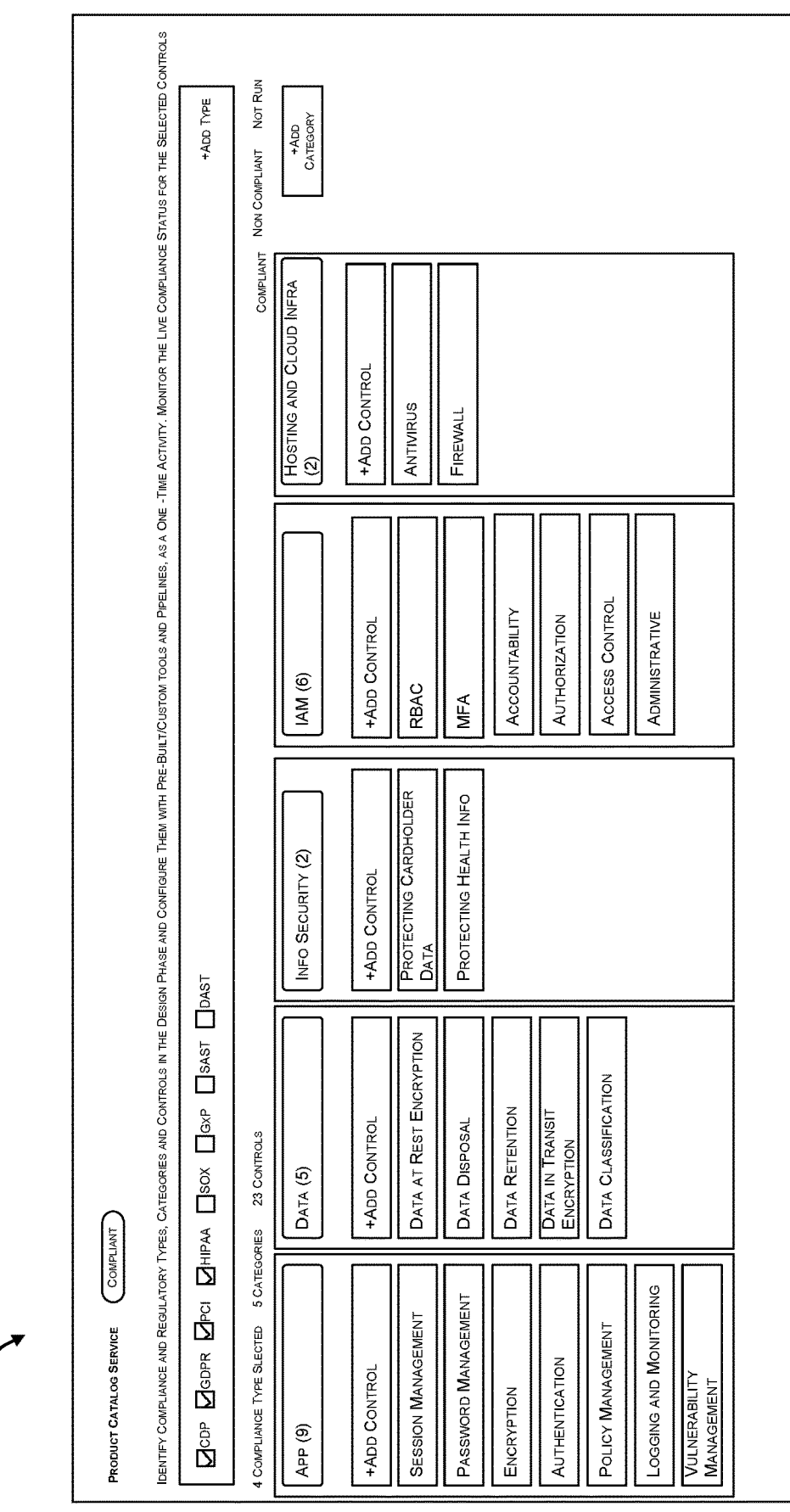

The example representation 1600C of FIG. 16C displays various compliance types and pre-defined controls for each compliance type. Each of these controls may be dynamically generated based on the compliance type selected. This is a highly extendable framework that may be customized with new compliance and controls added.

The example representation 1600D of FIG. 16D displays configuration of controls, where user may define which orchestrator may be used to execute, the frequency of execution, the method of execution, and the branch of execution, etc.

The example representation 1600E of FIG. 16E displays an interface to configure controls such as, define orchestrator tools, add custom tools, pipelines, schedule frequencies, etc.

Therefore, in accordance with embodiments of the present disclosure, the disclosed solution may reduce lead time for compliance procedures and validations, thereby reducing operational cost. Further, the disclosed solution may provide transparency in compliance process, and an improved way and ease of review process by a compliance officer. The disclosed solution facilitates standardization in compliance process with reduced overhead in maintenance and management of compliance requirements.

Figure 17:
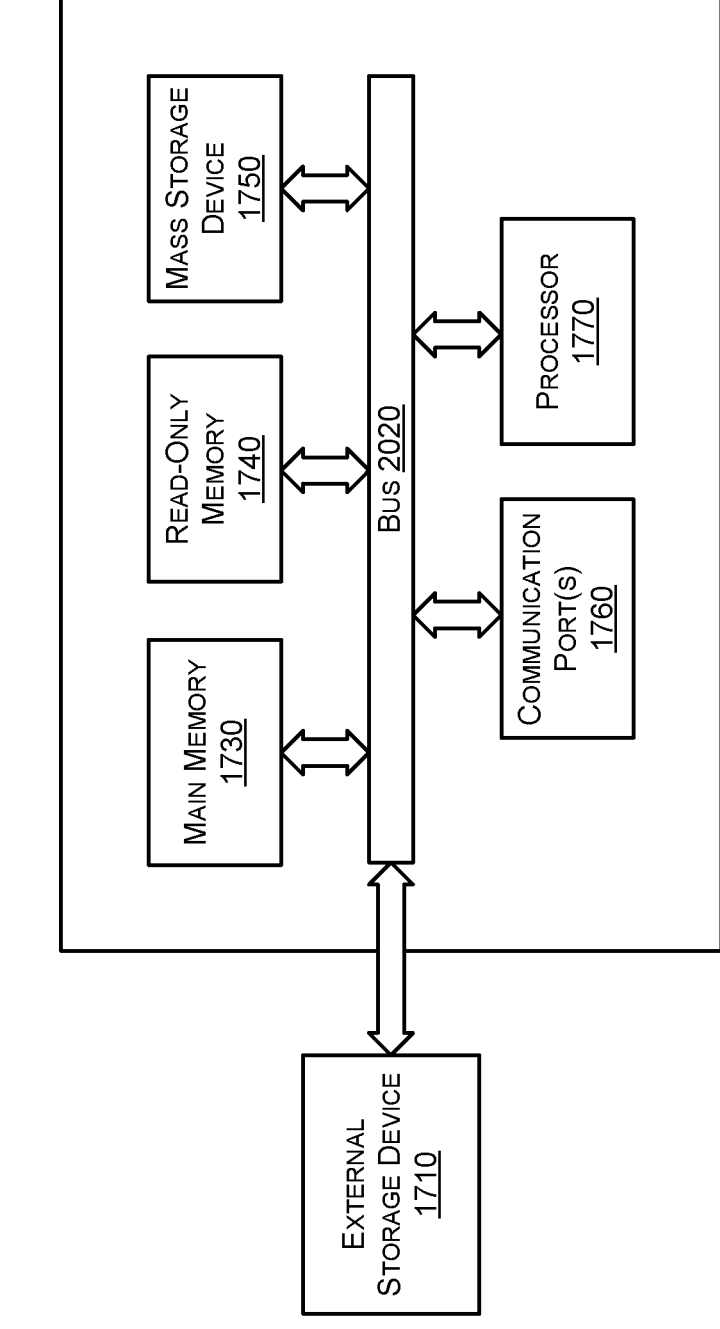
FIG. 17 illustrates a computer system in which or with which embodiments of the present disclosure may be implemented.

FIG. 17 illustrates a computer system 1700 in which or with which embodiments of the present disclosure may be implemented. In particular, the disclosed system, i.e. the compliance system may be implemented as the computer system 1700.

Referring to FIG. 17, the computer system 1700 may include an external storage device 1710, a bus 1720, a main memory 1730, a read-only memory 1740, a mass storage device 1750, communication port(s) 1760, and a processor 1770. A person skilled in the art will appreciate that the computer system 1700 may include more than one processor and communication ports. The communication port(s) 1760 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1760 may be chosen depending on a network, such a Local Area Network (LAN), Wide Area Network (WAN), or any network to which the computer system 1700 connects. The main memory 1730 may be random access memory (RAM), or any other dynamic storage device commonly known in the art. The read-only memory 1740 may be any static storage device(s) including, but not limited to, a Programmable Read Only Memory (PROM) chips for storing static information e.g., start-up or basic input/output system (BIOS) instructions for the processor 1770. The mass storage device 1750 may be any current or future mass storage solution, which may be used to store information and/or instructions. The bus 1720 communicatively couples the processor 1770 with the other memory, storage, and communication blocks. The bus 1720 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 1770 to the computer system 1700. Optionally, operator and administrative interfaces, e.g. a display, keyboard, and a cursor control device, may also be coupled to the bus 1720 to support direct operator interaction with the computer system 1700. Other operator and administrative interfaces may be provided through network connections connected through the communication port(s) 1760. In no way should the aforementioned exemplary computer system limit the scope of the present disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A compliance system, comprising:
a processor; and
a memory operatively coupled with the processor, wherein the memory comprises processor-executable instructions which, when executed by the processor, cause the processor to:
receive, via a network, from a user device associated with a user, a selection of a project in an enterprise and a compliance type corresponding to the selected project;
cause a list of controls associated with the selected compliance type to be displayed on a user interface of the user device;
receive, via the user interface over the network, a set of configurations for each of the list of controls from the user, wherein the set of configurations comprises at least a selection of an orchestrator engine from a plurality of orchestrator engines to execute each control in the list of controls;
dynamically generate, via the selected orchestrator engine, a schema based on the selected compliance type and the list of controls at a server;
receive, via the user interface, user inputs to develop custom APIs;
clone the generated schema in a project repository, wherein the project repository is automatically created using the custom APIs;
automatically trigger, an execution of validation of each of the list of controls for the selected compliance type based on the generated schema,
generate results of the validation, in response to the execution of validation of each of the list of controls, the results comprising a list of non-compliant controls and a list of compliant controls;

wherein the processor is to generate the schema by dynamically connecting respective configuration files with each other in a sequence to trigger the execution of the validation of each of the list of controls;

dynamically generate, via a machine learning engine, a set of remedies for fixing each of the non-compliant controls by:

applying a cosine similarity function, via a deduplication Machine Learning (ML) engine based on a context of issues to perform deduplication to identify unique non-compliant controls from the list of non-compliant controls;

generating and transmitting, via the machine learning engine, real-time remediation recommendations using generative pre-trained transformer models to provide the set of remedies in the form of relevant code for each of the identified unique non-compliant controls to the user, wherein the set of remedies comprises a root cause analysis of each of the identified unique non-compliant controls; and causing the machine learning engine to self-learn based on the set of remedies provided for each of the identified unique non-compliant controls, wherein the machine learning engine is the transformer model which uses deep learning and neural network trained on a plurality of parameters; and cause the generated set of remedies to be displayed on the user interface of the user device, wherein the set of remedies is caused to be executed or modified by the user to fix each of the non-compliant controls, and wherein the execution of validation of the list of controls is retriggered until each of the list of controls corresponding to the selected compliance type is compliant.

2. The system of claim 1, wherein the results of the validation are version controlled and secured by a blockchain.

3. The system of claim 1, wherein the processor is to:

generate and display real-time recommendations for compliance types corresponding to the selected project and controls corresponding to the selected compliance type on the user interface of the user device.

4. The system of claim 3, wherein the processor is to generate the real-time recommendations for the compliance types by:

generating a similarity score for each of the compliance types with respect to the selected compliance type; and generating, via the machine learning engine, the real-time recommendations for the compliance types based on the similarity score.

5. The system of claim 1, wherein to cause the list of controls to be displayed on the user interface, the processor is to:

extract the list of controls corresponding to the selected compliance type from a database, wherein the database comprises a mapping of the list of controls with the corresponding compliance type.

6. The system of claim 1, wherein the processor is to:

receive at least one of a custom compliance type and a custom control from the user; and dynamically define a set of controls for the custom compliance type and a set of validations for the custom control.

7. The system of claim 1, wherein the set of configurations further comprises at least one of a schedule of a frequency of execution for each control, a selection of a branch or environment for execution of each control, and a method for execution of each control.

8. The system of claim 1, wherein the plurality of orchestrator engines comprises at least one of a continuous integration tool, a continuous deployment tool, a custom tool, or an enterprise tool.

9. The system of claim 1, wherein the processor is to identify the unique non-compliant controls by:

determining an angle of closeness of a first vector corresponding to a non-compliant control from the list of non-compliant controls with a second vector corresponding to an existing set of non-compliant controls;

determining whether the angle is greater than or equal to a pre-configured threshold;

in response to a positive determination, identifying the non-compliant control as a duplicate non-compliant control; and in response to a negative determination, identifying the non-compliant control as a unique non-compliant control.

10. A computer-implemented method, comprising:

receiving, by a processor associated with a compliance system, from a user device associated with a user, via a network, a selection of a project in an enterprise and a compliance type corresponding to the selected project;

causing, by the processor, a list of controls associated with the selected compliance type to be displayed on a user interface of the user device;

receiving, by the processor, via the user interface over the network, a set of configurations for each of the list of controls from the user, wherein the set of configurations comprises at least a selection of an orchestrator engine from a plurality of orchestrator engines to execute each control in the list of controls;

dynamically generating, by the processor, via the selected orchestrator engine, a schema based on the selected compliance type, and the list of controls at a server;

receiving, by the processor, via the user interface, user inputs to develop custom APLs;

cloning, by the processor, the generated schema in a project repository, wherein the project repository is automatically created using the custom APIs:

automatically triggering, by the processor, an execution of validation of each of the list of controls for the selected compliance type based on the generated schema;

generating, by the processor, results of the validation, in response to the execution of the validation of the list of controls, the results comprising a list of non-compliant controls and a list of compliant controls wherein generating, by the processor, the schema comprises dynamically connecting respective configuration files with each other in a sequence to trigger the execution of the validation of each of the list of controls;

dynamically generating, by the processor via a machine learning engine, a set of remedies for fixing each of the non-compliant controls by:

applying, by the processor, a cosine similarity function, via a deduplication Machine Learning (ML) engine based on a context of issues to perform deduplication to identify unique non-compliant controls from the list of non-compliant controls;

generating and transmitting, by the processor via the machine learning engine, real-time remediation recommendations using generative pre-trained transformer models to provide the set of remedies in the form of relevant code for each of the identified unique non-compliant controls to the user, wherein the set of remedies comprises a root cause analysis of each of the identified unique non-compliant controls; and causing, by the processor, the machine learning engine to self-learn based on the set of remedies provided for each of the identified unique non-compliant controls, wherein the machine learning engine is the transformer model which uses deep learning and neural network trained on a plurality of parameters; and causing, by the processor, the generated set of remedies to be displayed on the user interface of the user device, wherein the set of remedies is caused to be executed or modified by the user to fix each of the non-compliant controls, and wherein the execution of validation of each of the list of controls is retriggered until the list of controls corresponding to the selected compliance type are complaint.

11. The computer-implemented method of claim 10, further comprising:

receiving, by the processor, at least one of a custom compliance type and a custom control from the user; and dynamically defining, by the processor, a set of controls for the custom compliance type and a set of validations for the custom control.

12. The computer-implemented method of claim 10, wherein the set of configurations further comprises at least one of a schedule of a frequency of execution for each control, a selection of a branch or environment for execution of each control, and a method for execution of each control.

13. The computer-implemented method of claim 10, wherein identifying, by the processor, the unique non-compliant controls comprises:

determining, by the processor, an angle of closeness of a first vector corresponding to a non-compliant control from the list of non-compliant controls with a second vector corresponding to an existing set of non-compliant controls;

determining, by the processor, whether the angle is greater than or equal to a pre-configured threshold;

in response to a positive determination, identifying, by the processor, the non-compliant control as a duplicate non-compliant control; and in response to a negative determination, identifying, by the processor, the non-compliant control as a unique non-compliant control.

14. The computer-implemented method of claim 10, wherein the plurality of orchestrator engines comprises at least one of a continuous integration tool, a continuous deployment tool, a custom tool, or an enterprise tool.

15. The computer-implemented method of claim 10, wherein causing, by the processor, the list of controls to be displayed on the user interface comprises:

extracting, by the processor, the list of controls corresponding to the selected compliance type from a database, wherein the database comprises a mapping of the list of controls with the corresponding compliance type.

16. A non-transitory computer-readable medium comprising processor-executable instructions that cause a processor to:

receive, via a network, from a user device associated with a user, a selection of a project in an enterprise and a compliance type corresponding to the selected project;

cause a list of controls associated with the selected compliance type to be displayed on a user interface of the user device;

receive, via the user interface over the network, a set of configurations for each of the list of controls from the user, wherein the set of configurations comprises at least a selection of an orchestrator engine from a plurality of orchestrator engines to execute each control in the list of controls;

dynamically generate, via the selected orchestrator engine, a schema based on the selected compliance type, and the list of controls at a server, and the selected orchestrator engine;

receive, via the user interface, user inputs to develop custom APIs:

clone the generated schema in a project repository, wherein the project repository is automatically created using the custom APIs;

automatically trigger an execution of validation of each of the list of controls for the selected compliance type based on the generated schema;

generate results of the validation, in response to the execution of validation of each of the list of controls, the results comprising a list of non-compliant controls land a list of compliant controls; wherein generating the schema comprises dynamically connecting respective configuration files with each other in a sequence to trigger the execution of the validation of each of the list of controls;

dynamically generate, via a machine learning engine, a set of remedies for fixing each of the non-compliant controls by:

applying a cosine similarity function, via a deduplication Machine Learning (ML) engine based on a context of issues to perform deduplication to identify unique non-compliant controls from the list of non-compliant controls;

generating and transmitting, via the machine learning engine, real-time remediation recommendations using generative pre-trained transformer models to provide the set of remedies in the form of relevant code for each of the identified unique non-compliant controls to the user, wherein the set of remedies comprises a root cause analysis of each of the identified unique non-compliant controls; and causing the machine learning engine to self-learn based on the set of remedies provided for each of the identified unique non-compliant controls, wherein the machine learning engine is the transformer model which uses deep learning and neural network trained on a plurality of parameters; and cause the generated set of remedies to be displayed on the user interface of the user device, wherein the set of remedies is caused to be executed or modified by the user to fix each of the non-compliant controls, and wherein the execution of validation of the list of controls is retriggered until each of the list of controls corresponding to the selected compliance type is compliant.

* * * * *